United States Patent
Shani et al.

(10) Patent No.: US 12,456,600 B2
(45) Date of Patent: Oct. 28, 2025

(54) SCANNING ELECTRON MICROSCOPY-BASED TOMOGRAPHY OF SPECIMENS

(71) Applicant: Applied Materials Israel Ltd., Rehovot (IL)

(72) Inventors: Itamar Shani, Mishmar David (IL); Konstantin Chirko, Rehovot (IL); Lior Yaron, Ness Ziona (IL); Guy Eytan, Kfar-Aviv (IL); Guy Shwartz, Ramat Gan (IL)

(73) Assignee: Applied Materials Israel Ltd., Rehovot (IL)

( * ) Notice: Subject to any disclaimer, the term of this patent is extended or adjusted under 35 U.S.C. 154(b) by 295 days.

(21) Appl. No.: 18/203,034

(22) Filed: May 29, 2023

(65) Prior Publication Data

US 2024/0404784 A1    Dec. 5, 2024

(51) Int. Cl.
*H01J 37/28*   (2006.01)
*G06T 11/00*   (2006.01)
*G06T 11/20*   (2006.01)

(52) U.S. Cl.
CPC ............ *H01J 37/28* (2013.01); *G06T 11/006* (2013.01); *G06T 11/206* (2013.01);
(Continued)

(58) Field of Classification Search
CPC ............... H01J 37/28; H01J 2237/2801; H01J 2237/2813; G06T 11/006; G06T 11/206; G06T 2211/40
See application file for complete search history.

(56) References Cited

U.S. PATENT DOCUMENTS

| 8,581,189 B2 | 11/2013 | Boughorbel et al. |
| 10,354,418 B2 | 7/2019 | Recur et al. |

(Continued)

FOREIGN PATENT DOCUMENTS

| EP | 2708874 A1 * | 3/2014 | ........... G06T 11/005 |
| EP | 2 557 587 B1 | 10/2015 | |
| EP | 3 297 018 B1 | 3/2019 | |

*Primary Examiner* — Nicole M Ippolito
(74) *Attorney, Agent, or Firm* — Kilpatrick Townsend & Stockton LLP

(57) ABSTRACT

Disclosed herein is a system for non-destructive tomography of specimens. The system includes a scanning electron microscope (SEM) and a processor(s). The SEM is configured to obtain a sinogram of a tested specimen, parameterized by a vector $\vec{s}$, by projecting e-beams on the tested specimen, at each of a plurality of projection directions and offsets, and. for each e-beam, measuring a respective intensity of electrons returned from the tested specimen, The processor(s) is configured to obtain a tomographic map, pertaining to the tested specimen, by determining values indicative of components of a vector $\vec{t}$ defined by an equation $W\vec{t}=\vec{s}$. W is a matrix with components $w_{ij}$ specifying a contribution of a j-th voxel in a nominal specimen to an i-th element of a nominal sinogram of the nominal specimen. The matrix W accounts for e-beam expansion and attenuation with depth within the nominal specimen.

20 Claims, 11 Drawing Sheets
(1 of 11 Drawing Sheet(s) Filed in Color)

---

Obtaining a sinogram of a tested specimen by (*i*) sequentially projecting e-beams so as to impinge the tested specimen at each of a plurality of projection directions and a plurality of offsets, respectively, and (*ii*) for each e-beam, measuring a respective intensity of electrons returned from the tested specimen.

— 110

Obtaining a tomogram of the tested specimen by determining values indicative of components of a vector $\vec{t}$ defined via $W\vec{t} = \vec{s}$. $\vec{s}$ parameterizes the sinogram of the tested specimen obtained in operation 110. The matrix W accounts for e-beam expansion and attenuation with depth within a nominal specimen, which is of a same, or a similar, design intent as the tested specimen. Each of components $w_{ij}$ of W respectively specifies a contribution of a *j*-th voxel in the nominal specimen to an *i*-th voxel of a nominal sinogram of the nominal specimen.

— 120

100

(52) U.S. Cl.
CPC ... *G06T 2211/40* (2013.01); *H01J 2237/2801* (2013.01); *H01J 2237/2813* (2013.01)

(56) References Cited

U.S. PATENT DOCUMENTS

2016/0232662 A1* 8/2016 Printemps .................. G06T 7/32
2016/0307729 A1* 10/2016 Lazic ...................... H01J 37/28

* cited by examiner

Obtaining a sinogram of a tested specimen by (i) sequentially projecting e-beams so as to impinge the tested specimen at each of a plurality of projection directions and a plurality of offsets, respectively, and (ii) for each e-beam, measuring a respective intensity of electrons returned from the tested specimen.

110

Obtaining a tomogram of the tested specimen by determining values indicative of components of a vector $\vec{t}$ defined via $W\vec{t} = \vec{s}$. $\vec{s}$ parameterizes the sinogram of the tested specimen obtained in operation 110. The matrix $W$ accounts for e-beam expansion and attenuation with depth within a nominal specimen, which is of a same, or a similar, design intent as the tested specimen. Each of components $w_{ij}$ of $W$ respectively specifies a contribution of a $j$-th voxel in the nominal specimen to an $i$-th voxel of a nominal sinogram of the nominal specimen.

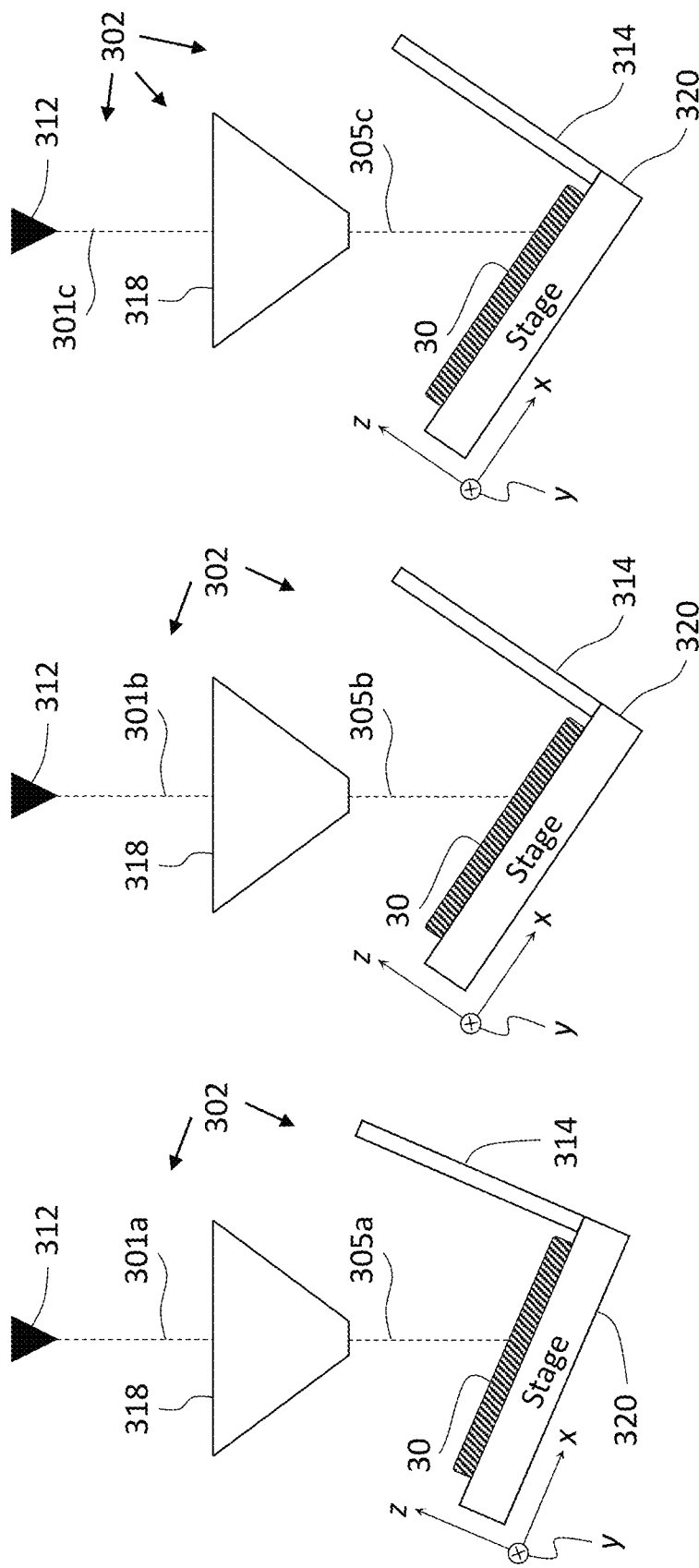

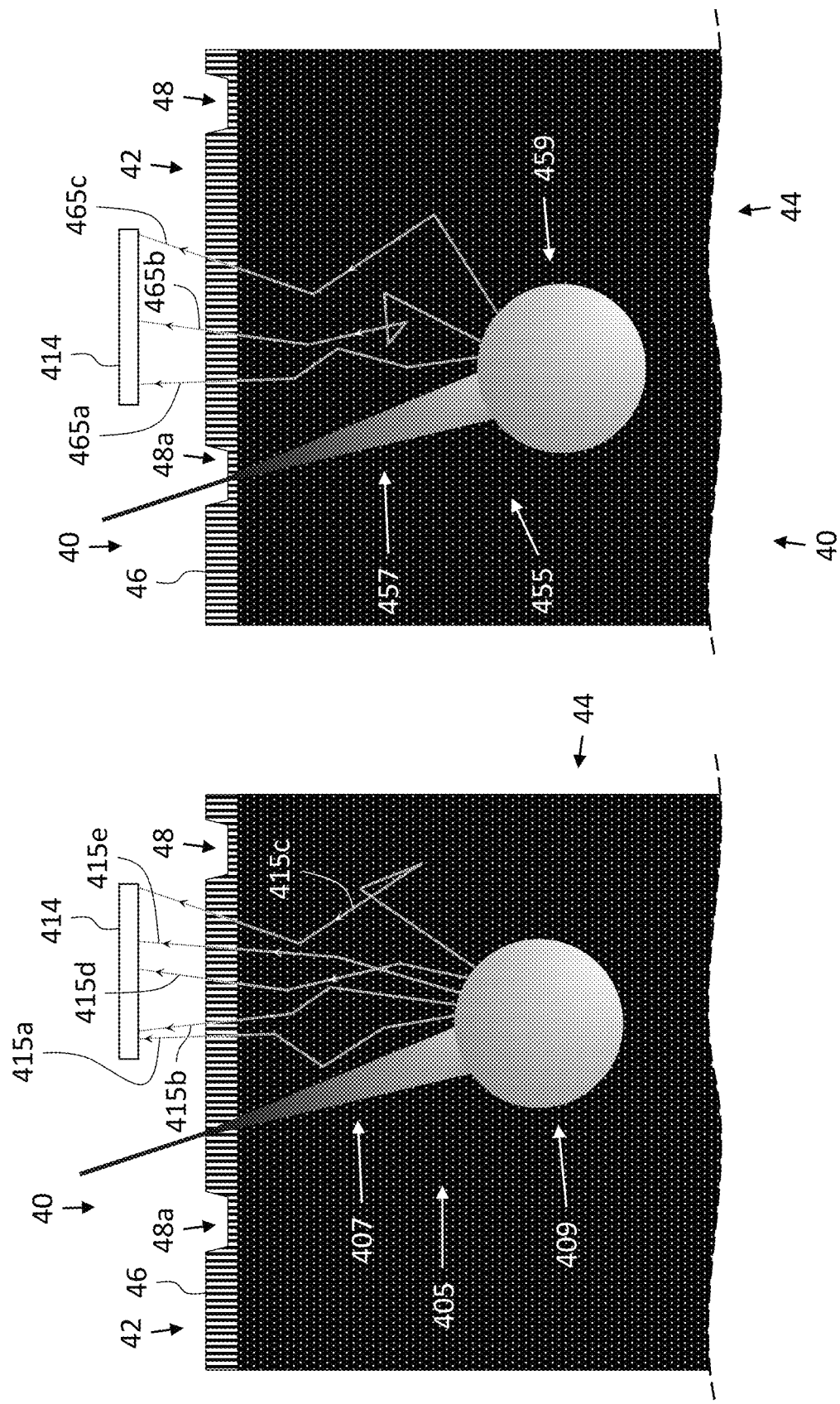

Obtaining a sinogram of a tested specimen by (*i*) sequentially projecting e-beams so as to impinge the tested specimen at each of a plurality of projection directions and a plurality of offsets, respectively, and (*ii*) for each e-beam. measuring a respective intensity of electrons returned from the tested specimen.

⌞— 710

Obtaining a difference sinogram $\vec{a}$ by subtracting a nominal sinogram from the obtained sinogram. The nominal sinogram pertains to a nominal specimen, which is of a same, or a similar, design intent as the tested specimen.

⌞— 715

Obtaining a difference tomogram parameterized by a vector $\vec{b} = \vec{t} - \vec{t}'$ by solving for $\vec{b}$ the equation $W'\vec{b} = \vec{a}$. $\vec{t}$ parameterizes a tomogram of the tested specimen and $\vec{t}'$ parameterizes a (nominal) tomogram of the nominal specimen. The matrix W accounts for e-beam expansion and attenuation with depth within a nominal specimen. Each of components $w_{ij}$ of W respectively specifies a contribution of a *j*-th voxel in the nominal specimen to an *i*-th voxel of a nominal sinogram of the nominal specimen.

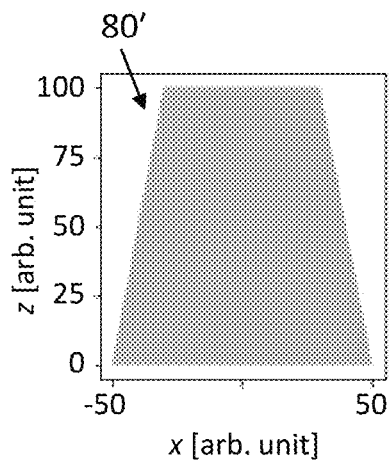
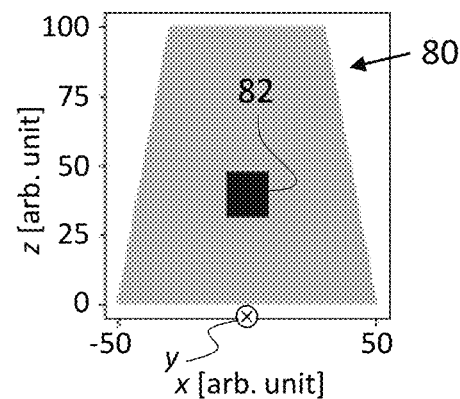
Fig. 8A    Fig. 8B
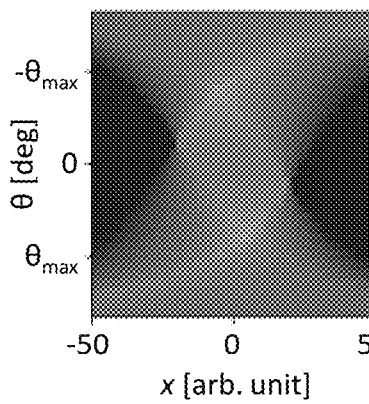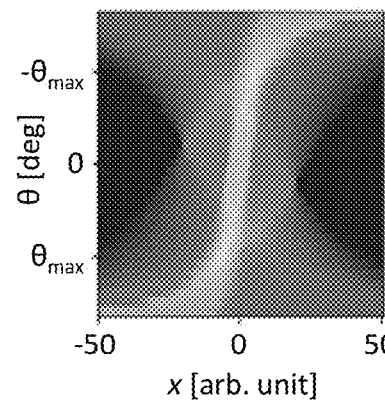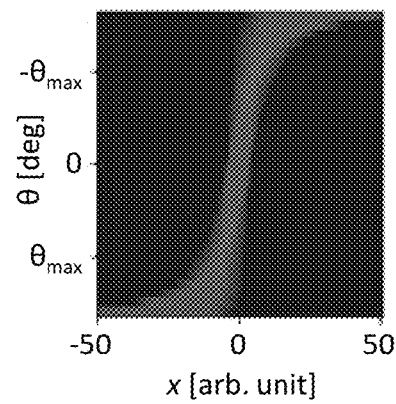
Fig. 8C    Fig. 8D    Fig. 8E
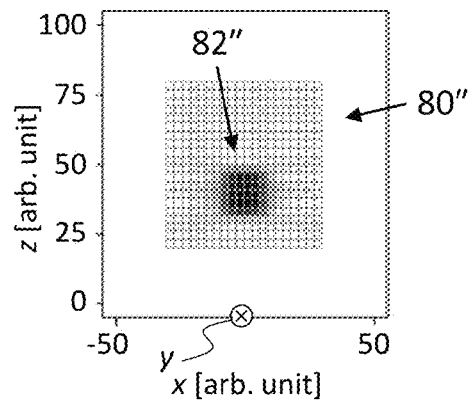
Fig. 8F

SCANNING ELECTRON MICROSCOPY-BASED TOMOGRAPHY OF SPECIMENS

TECHNICAL FIELD

The present disclosure relates generally to electron tomography.

BACKGROUND

Typically, in electron tomography a transmission electron microscope is used to collect data from a thin specimen (having a thickness of ~100 nm or less). The collected data—also referred to as a (three-dimensional) sinogram—is obtained for a plurality of incidence angles and offsets of the impinging e-beams. Using techniques, such as algebraic reconstruction technique (ART), a tomogram (e.g. density map) of the specimen is generated.

SUMMARY

Aspects of the disclosure, according to some embodiments thereof, relate to electron tomography. More specifically, but not exclusively, aspects of the disclosure, according to some embodiments thereof, relate to scanning electron microscopy-based tomography.

Thus, according to an aspect of some embodiments, there is provided a system for non-destructive tomography of specimens. The system includes a scanning electron microscope (SEM) and one or more processors. The SEM is configured to obtain a sinogram of a tested specimen, parameterized by a vector $\vec{s}$, by sequentially projecting e-beams on the tested specimen at each of a plurality of projection directions and a plurality of offsets, respectively, and, for each of the e-beams, measuring a respective intensity of electrons returned from the tested specimen (due to the penetration thereinto the e-beam). The one or more processors are configured to obtain a tomographic map, pertaining to the tested specimen, by determining values indicative of components of a vector $\vec{t}$ (which on determination thereof will parameterize the tomogram of the tested specimen) defined by an equation $W\vec{t} = \vec{s}$. W is a matrix with components $w_{ij}$ specifying a contribution of a j-th voxel in a nominal specimen to a value of an i-th element of a nominal sinogram of the nominal specimen, respectively. The tested specimen is of a same, or a similar, design intent as the nominal specimen. The matrix W accounts for e-beam expansion and/or attenuation with depth within the nominal specimen.

According to some embodiments of the system, the SEM includes an electron gun, one or more electron sensors, electron optics including a compound lens, and a scanner module. The compound lens is configured to focus on the specimen an e-beam generated by the electron gun. The scanner module is configured to offset the e-beam. Additional electron optics may be used to controllably orient the e-beam (i.e. controllably set the projection direction thereof).

According to some embodiments of the system, the tomographic map is constituted by a difference tomogram parameterized by a vector $\vec{b} = \vec{t} - \vec{t}'$, wherein $\vec{t}'$ is a vector specifying a tomogram of the nominal specimen. As part of obtaining the tomographic map, the one or more processors are configured to (i) obtain a difference sinogram by subtracting the nominal sinogram from the sinogram, obtained in the operation of using the SEM, and (ii) solve for $\vec{b}$ an equation $W\vec{b} = \vec{a}$, $\vec{a} = \vec{s} - \vec{s}'$ with $\vec{s}'$ being a vector parameterizing the nominal sinogram of the nominal specimen.

According to some embodiments of the system, the offsets are along at least two non-parallel directions.

According to some embodiments of the system, the obtained tomographic map is three-dimensional.

According to some embodiments of the system, each non-vanishing component of W is greater than a preselected threshold value, thereby expediting the solving of $W\vec{t} = \vec{s}$.

According to some embodiments of the system, as part of the obtaining of the difference sinogram, prior to the subtraction of the nominal sinogram, the one or more processors are further configured to register the obtained sinogram relative to the nominal sinogram.

According to some embodiments of the system, a number of the projection directions is between about 5 and about 100.

According to some embodiments of the system, $\max_{i,j \neq i} \delta_{ij} \leq 120°$ with $\delta_{ij}$ denoting an angle between i-th and j-th projection directions from the plurality of projection directions and the maximization being carried out over all the projection directions.

According to some embodiments of the system, the projection directions are changed at angular increments of between about 0.2° and about 30°.

According to some embodiments of the system, adjacent e-beams are offset relative to one another by between about 0.2 nm (nanometer) and about 2 nm.

According to some embodiments of the system, the e-beam is continuously scanned on the tested specimen (so as to be continuously offset).

According to some embodiments of the system, the e-beam projection directions define a plurality of non-parallel planes.

According to some embodiments of the system, the one or more processors are configured to iteratively solve for $\vec{t}$ the equation $W\vec{t} = \vec{s}$.

According to some embodiments of the system, the one or more processors are configured to execute an algebraic reconstruction technique (ART) algorithm to solve the equation.

According to some embodiments of the system, the ART algorithm is selected from a standard ART algorithm, a simultaneous iterative reconstructive technique (SIRT) algorithm, a simultaneous algebraic reconstruction technique (SART) algorithm, and a discrete algebraic reconstruction technique (DART) algorithm.

According to some embodiments of the system, the tested specimen is or includes a semiconductor structure.

According to some embodiments of the system, the semiconductor structure is disposed on a bulk (e.g. a silicon bulk).

According to some embodiments of the system, the semiconductor structure is of a thickness smaller than 1 μm (micrometer).

According to some embodiments of the system, the semiconductor structure is a gate all around (GAA) transistor or a fin field effect transistor (FinFET).

According to some embodiments of the system, the tested specimen is a patterned wafer, optionally, in one of fabrication stages thereof.

According to an aspect of some embodiments, there is provided a computer-based method for non-destructive scanning electron microscopy-based tomography of specimens. The method includes operations of:

sequentially projecting e-beams so as to impinge a tested specimen at each of a plurality of projection directions and a plurality of offsets, respectively, and, for each of the e-beams, measuring a respective intensity of electrons returned from the tested specimen (due to the penetration thereinto of the e-beam), thereby obtaining a sinogram parameterized by a vector $\vec{s}$; and obtaining a tomographic map pertaining to the tested specimen by determining values indicative of components of a vector $\vec{t}$, which is defined by an equation $W\vec{t} = \vec{s}$, wherein W is a matrix with components $w_{ij}$ specifying a contribution of a j-th voxel in a nominal specimen to a value of an i-th element of a nominal sinogram of the nominal specimen, respectively.

The tested specimen is of a same, or a similar, design intent as the nominal specimen. The matrix W accounts for e-beam expansion and/or attenuation with depth within the nominal specimen.

According to some embodiments of the method, the method further includes an intermediate operation, wherein a difference sinogram is obtained by subtracting the nominal sinogram from the sinogram obtained in the operation of using the SEM. The tomographic map is constituted by a difference tomogram, which is parameterized by a vector $\vec{b} = \vec{t} - \vec{t}'$, wherein $\vec{t}'$ is a vector specifying a tomogram of the nominal specimen. The operation of obtaining the tomographic map includes solving for $\vec{b}$ an equation $W\vec{b} = \vec{a}$, wherein $\vec{a} = \vec{s} - \vec{s}'$ with $\vec{s}'$ being a vector specifying a nominal sinogram of the nominal specimen.

According to some embodiments of the method, the offsets are along at least two non-parallel directions.

According to some embodiments of the method, the obtained tomographic map is three-dimensional.

According to some embodiments of the method, each non-vanishing component of W is greater than a preselected threshold value, thereby expediting the solving of $W\vec{t} = \vec{s}$.

According to some embodiments of the method, the method further includes an initial operation of obtaining a nominal tomogram (i.e. the vector $\vec{t}'$) pertaining to the nominal specimen, and, based at least thereon and e-beam data specifying the expansion and attenuation of e-beams within the nominal specimen, deriving the matrix W.

According to some embodiments of the method, the nominal tomogram is derived based on ground truth data obtained by:

extracting lamellas from the nominal specimen and/or shaving slices there off, and/or extracting lamellas from one or more reference specimens and/or shaving slices off thereof, the one or more reference specimens being of a same intended design as the tested specimen; and subjecting the lamellas and/or the slices to transmission electron microscopy.

According to some embodiments of the method, the e-beam data is generated using a computer simulation modeling the expansion and attenuation of e-beams in the nominal specimen.

According to some embodiments of the method, the matrix W is derived further taking into account a nominal sinogram pertaining to the nominal specimen.

According to some embodiments of the method, the obtaining of the difference sinogram further includes, prior to the subtraction of the nominal sinogram, registering the obtained sinogram relative to the nominal sinogram.

According to some embodiments of the method, a number of the projection directions is between about 5 and about 100.

According to some embodiments of the method, $\max_{i,j\neq I} \delta_{ij} \leq 120°$ with $\delta_{ij}$ denoting an angle between i-th and j-th projection directions from the plurality of projection directions and the maximization being carried out over all the projection directions.

According to some embodiments of the method, the projection directions are varied at angular increments of between about 0.2° and about 30°.

According to some embodiments of the method, adjacent e-beams are offset relative to one another by between about 0.2 nm and about 2 nm.

According to some embodiments of the method, each e-beam is continuously scanned on the tested specimen (so as to be continuously offset).

According to some embodiments of the method, the e-beam projection directions define a plurality of non-parallel planes.

According to some embodiments of the method, $W\vec{t} = \vec{s}$ is iteratively solved for $\vec{t}$.

According to some embodiments of the method, an ART algorithm is employed to solve the equation.

According to some embodiments of the method, the ART algorithm is selected from a standard ART algorithm, a SIRT algorithm, a SART algorithm, and a DART algorithm.

According to some embodiments of the method, the tested specimen is or includes a semiconductor structure.

According to some embodiments of the method, the semiconductor structure is disposed on a bulk (e.g. a silicon bulk).

According to some embodiments of the method, the semiconductor structure is of a thickness smaller than 1 μm.

According to some embodiments of the method, the semiconductor structure is a GAA transistor or a FinFET.

According to some embodiments of the method, the tested specimen is a patterned wafer, optionally, in one of fabrication stages thereof.

According to an aspect of some embodiments, there is provided a non-transitory computer-readable storage medium. The storage medium stores instructions that cause a system for non-destructive tomography of specimens, such as the above-described system, to implement the above-described method with respect to a tested specimen.

According to an aspect of some embodiments, there is provided a non-transitory computer-readable storage medium. The storage medium stores instructions that, given a sinogram of a tested specimen, cause one or more processors to obtain a tomographic map, pertaining to the tested specimen by determining values indicative of components of a vector $\vec{t}$ (which on determination thereof will parameterize the tomogram of the tested specimen) defined by an equation $W\vec{t} = \vec{s}$. $\vec{s}$ parameterizes the sinogram of the tested specimen. W is a matrix with components $w_{ij}$ specifying a contribution of a j-th voxel in a nominal specimen to a value of an i-th element of a nominal sinogram of the nominal specimen, respectively. The tested specimen is of a same, or a similar, design intent as the nominal specimen. The matrix W accounts for e-beam expansion and/or attenuation with depth within the nominal specimen.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, flash memories, solid state drives (SSDs), or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

The patent or application file contains at least one drawing executed in color. Copies of this patent or patent application publication with color drawing(s) will be provided by the Office upon request and payment of the necessary fee.

In the figures:

Figure 5A:
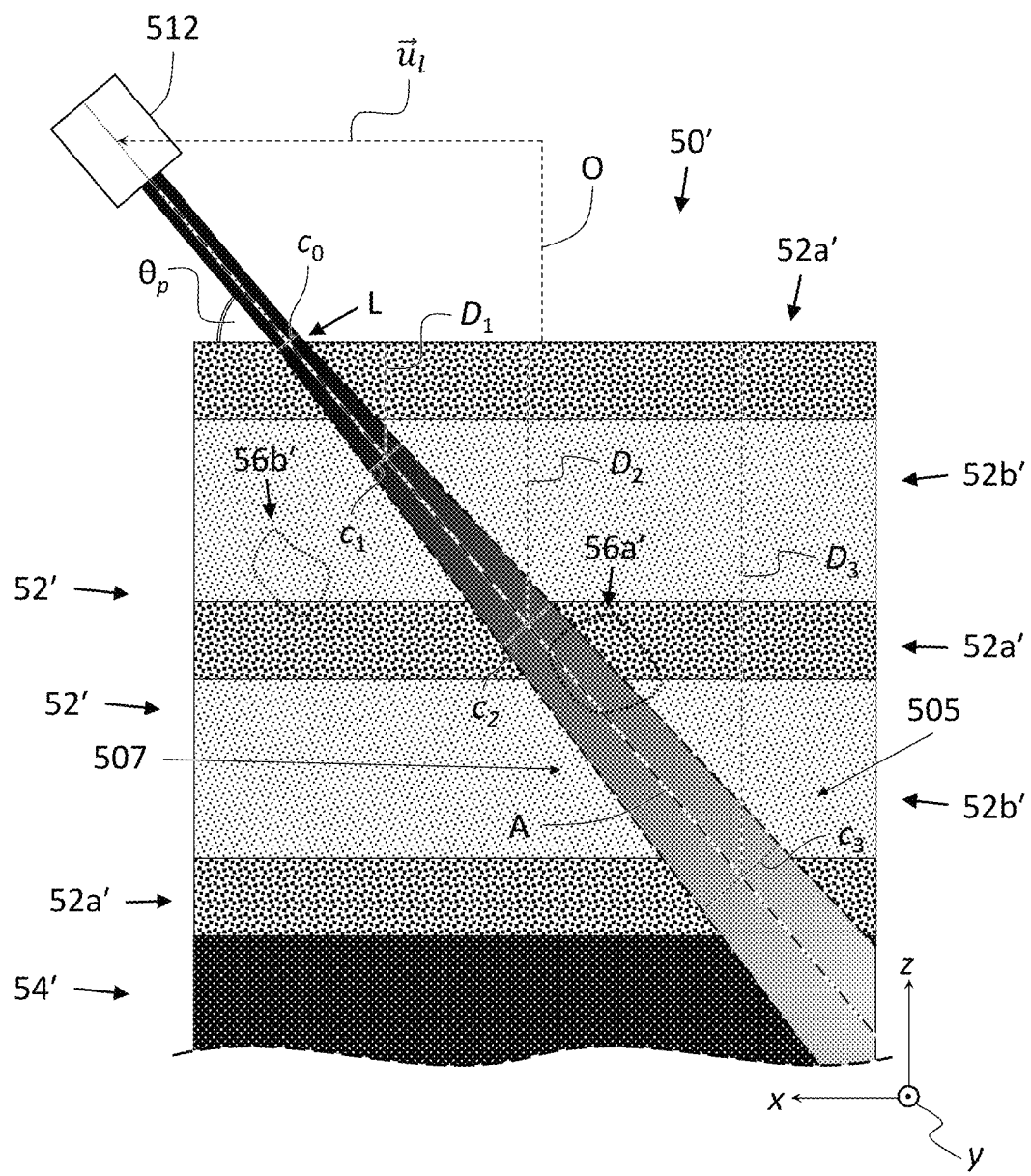
Figures 5B, 5C:
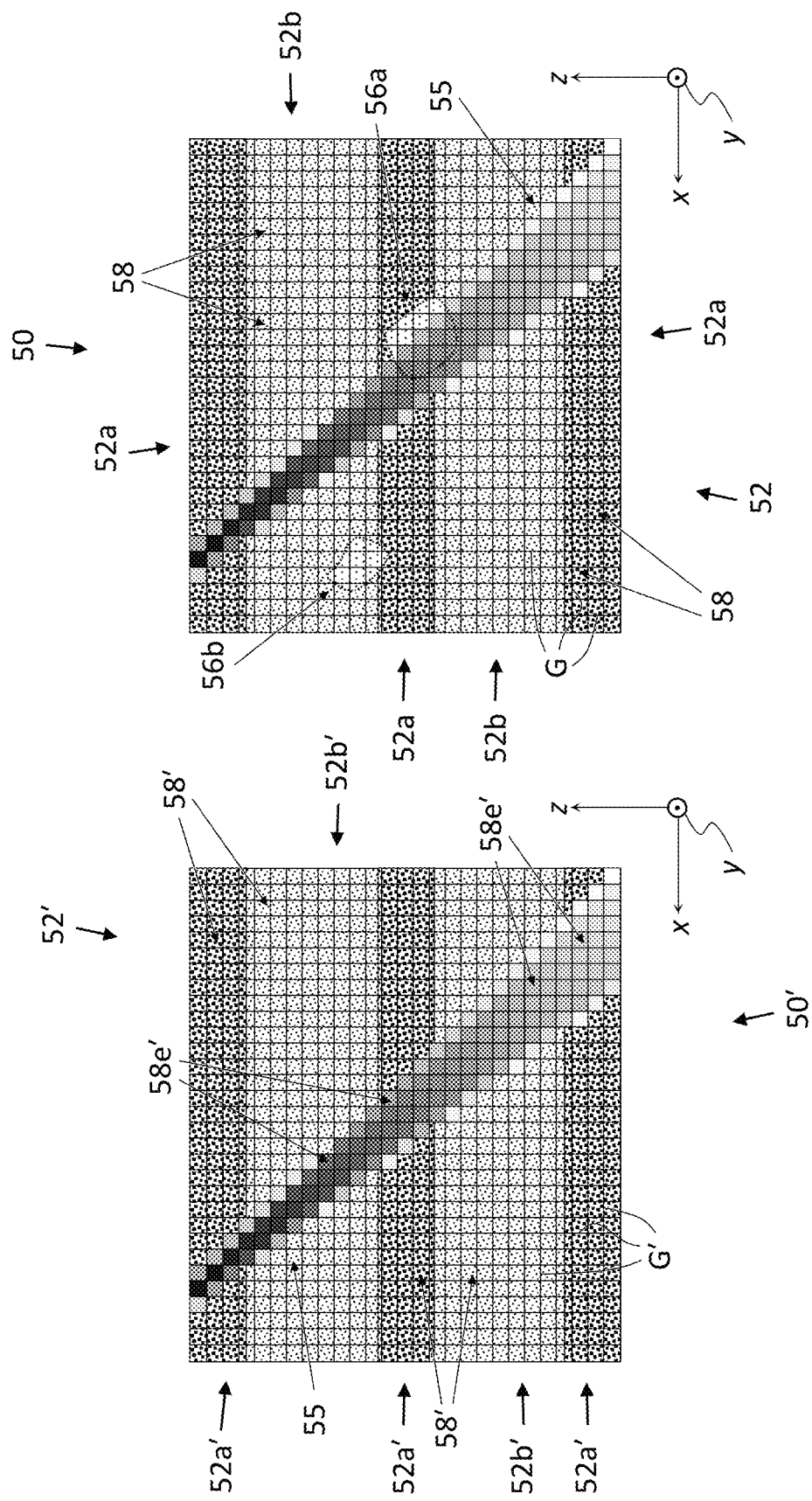
Figure 6A:
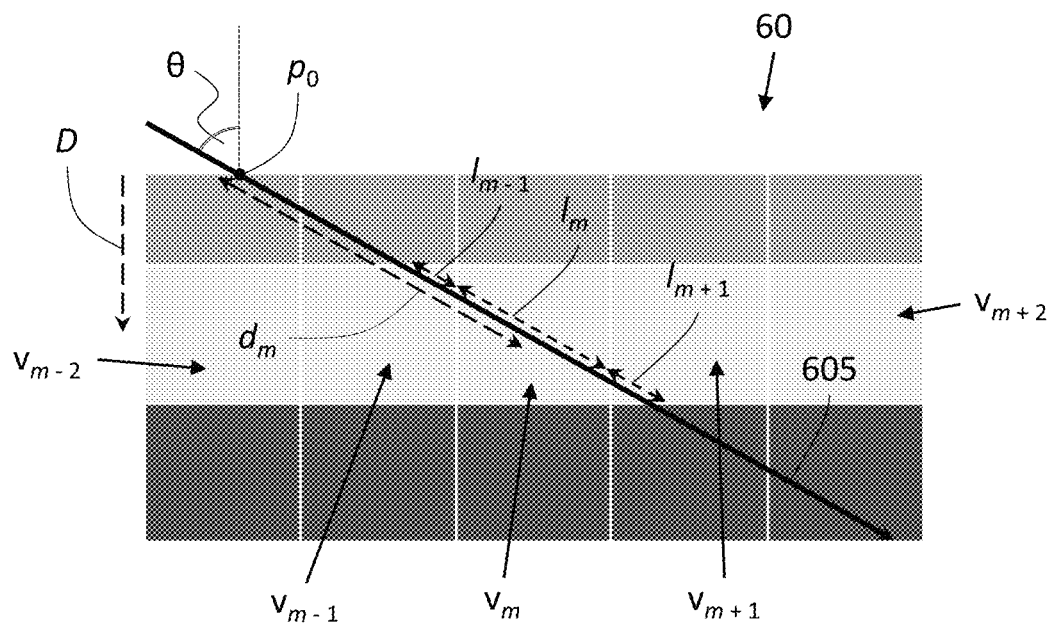
Figure 6B:
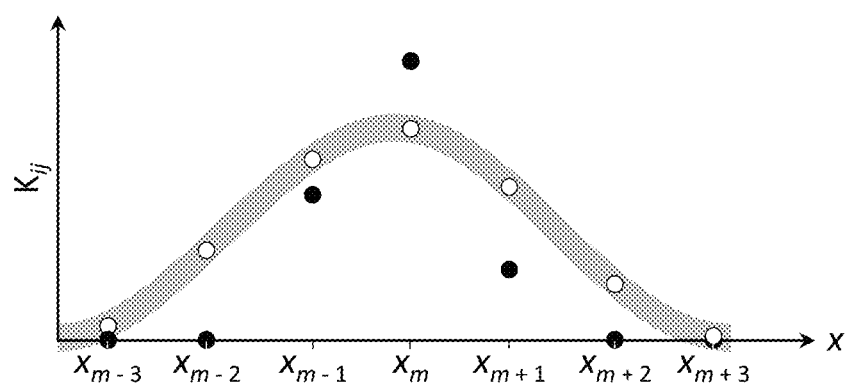
Figure 9:
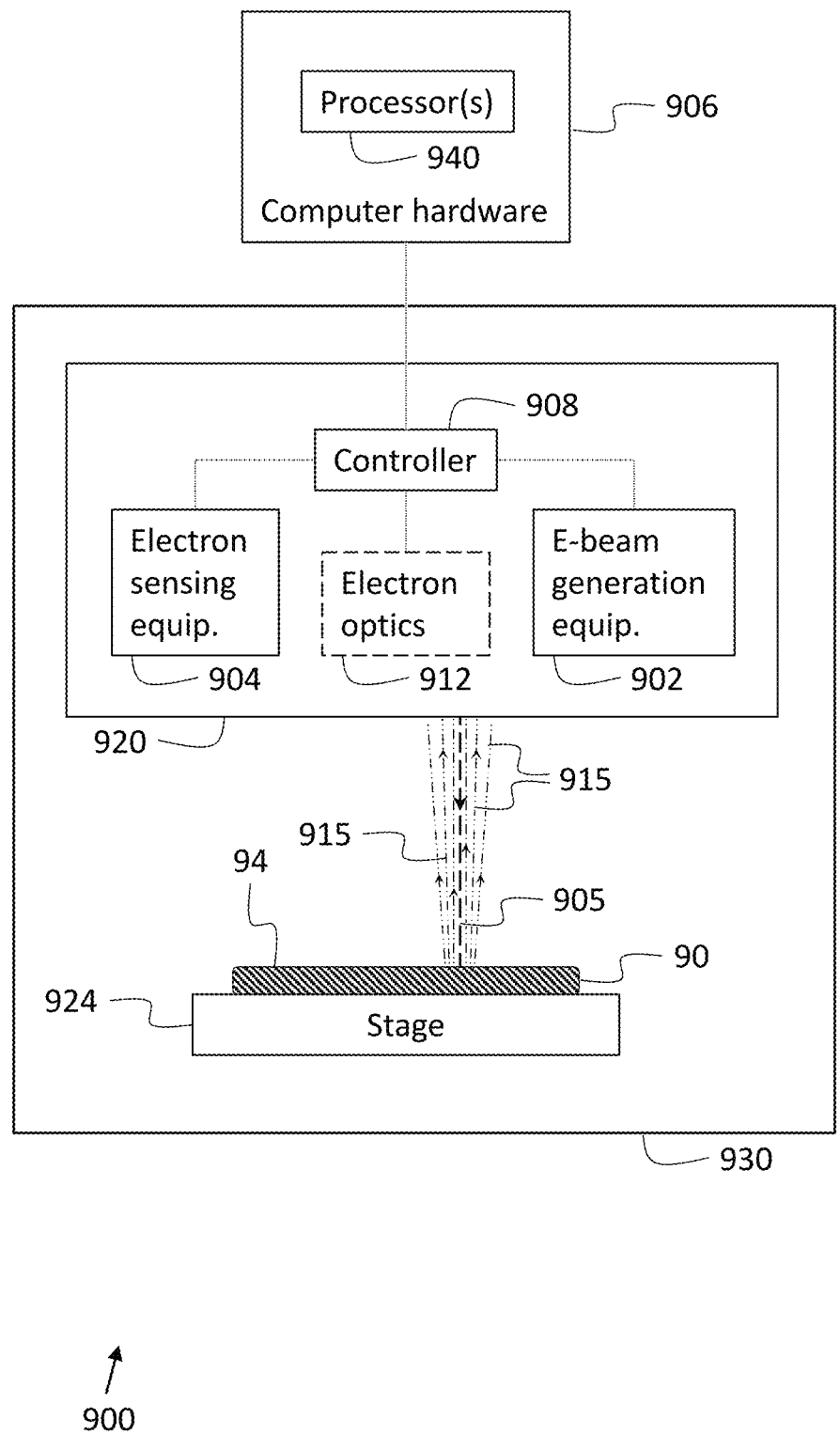

FIG. 1 presents a flowchart of a scanning electron microscopy-based method for tomography of specimens, according to some embodiments:

FIGS. 2A to 2F schematically depict a specimen subject to measurements in accordance with the method of FIG. 1, according to some embodiments:

FIGS. 3A to 3C schematically depict a specimen subject to measurements in accordance with the method of FIG. 1, according to some embodiments:

FIG. 4A schematically depicts expansion and attenuation of an e-beam within a nominal specimen, according to some embodiments:

FIG. 4B schematically depicts expansion and attenuation of an e-beam within a tested specimen of a same design intent as the nominal specimen of FIG. 4A, according to some embodiments:

FIG. 5A schematically depicts expansion and attenuation of an e-beam within a top layer of a nominal specimen, according to some embodiments:

FIG. 5B schematically depicts a voxelated e-beam corresponding to the e-beam of FIG. 5A and superimposed on a cross-sectional image of the top layer of FIG. 5A, according to some embodiments:

FIG. 5C schematically depicts the voxelated e-beam of FIG. 5B superimposed on a cross-sectional image of a tested specimen of a same design intent as the nominal specimen of FIG. 3A, according to some embodiments;

FIGS. 6A and 6B illustrate a derivation of a matrix W used in method 100, according to some embodiments thereof, to obtain a tomogram from a sinogram:

FIG. 7 presents a flowchart of a scanning electron microscopy-based method for depth-profiling of specimens, which corresponds to specific embodiments of the method of FIG. 1:

FIGS. 8A to 8F present results of a computer simulation modeling application of the method of FIG. 7, according to some embodiments thereof; and FIG. 9 schematically depicts a system for non-destructive scanning electron microscopy-based tomography of specimens, according to some embodiments.

DETAILED DESCRIPTION

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

Electron tomography utilizes the high-penetrability of energetic e-beams to reveal hidden structural features within a specimen, which are buried at sub-micron depths. This high penetrability allows for the nondestructive 3D (tomographic) mapping of thin specimens (having a thickness of ~100 nm) using a transmission electron microscope (TEM). (Thicker specimens can be destructively 3D mapped by the extraction of lamellas therefrom, or the shaving of slices thereof, and imaging of each using a TEM.)

The energies of the e-beams are typically selected such that the majority of the electrons cross the specimen without being scattered by matter therein and almost all of the scattered electrons are scattered only once. The electron beam is thus a "pencil beam" virtually constituting a narrow line traversing the specimen. The electron beam thus complies with a standard assumption that the e-beam does not expand within the specimen. More precisely, the equation W $\vec{t}=\vec{s}$ is solved under said assumption with $\vec{t}$ denoting the to-be-obtained tomogram of the specimen (or a structure included in the specimen) and $\vec{s}$ the measured sinogram of the specimen. Accordingly, for each i and j, $w_{ij}$—the (i, j)-th component of W, which governs the contribution of the j-th voxel of the specimen (which corresponds to the j-th component of $\vec{t}$) to the i-th element of the sinogram (i.e. the i-th component of $\vec{s}$)—is given by the intersection length of the i-th e-beam with the j-th voxel.

Algorithms for solving the above equation (i.e. $W\vec{t}=\vec{s}$) include filtered back projection (FBP) and algebraic reconstruction technique (ART). The quality of the 3D reconstruction (i.e. the resolution and accuracy of the derived tomogram) depends on the size and number of angular increments by which the e-beam incidence angle is varied during the sinogram acquisition. Increasing the size of the angular increments and/or decreasing the angular range may result in the appearance of (unwanted) reconstruction artefacts. To avoid such artefacts, typically, the e-beam incidence angle is varied by ~1° or ~2° within the) ~(−60°) to ~60° range, resulting in long sinogram acquisition times.

Recently, an alternative approach to electron tomography, based on scanning electron microscopy, has been developed: Rather than sensing electrons, which have been transmitted through a specimen (as is the case in the standard approach employed in TEM tomography), electrons returned from the specimen are sensed. As such, when the tested specimen is not thin, essentially all of the returned electrons will undergo multiple scatterings. Since the standard assumption of virtually only single scattering no longer holds, it seems that the above-described techniques (prior to this paragraph) in the context of TEM tomography cannot be used to extract a quality tomographic image from a SEM acquired sinogram.

The present disclosure, according to some embodiments thereof, teaches how to account for these multiple scattering events—or equivalently, e-beam expansion and attenuation within a tested specimen—on a computational level without resorting to energy filtering (or other experimental means) to discriminate singly scattered electrons from multiply scattered electrons. Accordingly, the systems and methods of the present disclosure may be nondestructively applied to specimens, which are not thin, since extraction of lamellas or shaving of slices are not necessitated. Of particular relevance to semiconductor manufacturing, the disclosed systems and methods are advantageously amenable to implementation on an in-line tool, thereby allowing for high-volume production. More specifically, according to some embodiments, the disclosed systems and methods rely on prior knowledge about expansion and attenuation of e-beams in specimens of a same, and/or a similar, intended design as the tested specimen. Advantageously, instead of fully mapping the tested specimen, the 3D reconstruction task is reduced to a linear task of quantifying deviations from the intended design, which may be localized in specific region of the specimen or otherwise limited to a structure therein. As a further advantage, the reliance on such prior knowledge allows significantly reducing the size and/or the number of the angular increments utilized to acquire the sinogram.

As used herein, the acronyms "SEM" and "BSE" stand for "scanning electron microscope" and "backscattered electrons", respectively. "E-beam" stands for "electron beam". The terms "tomogram", "tomographic image", and "tomographic map" are used interchangeably. "3D tomogram" stands for "three-dimensional tomogram" and refers to a set of (two-dimensional) tomographic images corresponding to sections (e.g. successively adjacent slices) of a specimen, which together "span" a volume of the specimen, or, more precisely, from which a three-dimensional tomographic map (e.g. a density map) of the volume may be derived.

To render the description clearer, throughout the description, certain symbols are used exclusively to label specific types of parameters and/or quantities. The vector $\vec{s}$ is used to parametrize a sinogram. The vector $\vec{t}$ is used to parametrize a tomogram. The matrix W relates a sinogram of a specimen to a tomogram thereof via the equation $W\vec{t}=\vec{s}$. In the context of the testing of a specimen (a "tested specimen"), the prime symbol may be used to denote that a parameter or a quantity pertains to a nominal specimen, which is of a same, or a similar, design intent as the tested specimen. Accordingly, the vector $\vec{s}'$ and the vector $\vec{t}'$ are used to parametrize a nominal sinogram and a nominal tomogram, respectively. The vector $\vec{a}$ is used to parametrize a difference sinogram, that is, the difference between a sinogram of a tested specimen and a nominal sinogram (i.e. a sinogram pertaining to a nominal specimen). The vector $\vec{b}$ is used to parametrize a difference tomogram, that is, the difference between a tomogram of the tested specimen and a nominal tomogram (i.e. a tomogram pertaining to the nominal specimen).

The symbols $\vec{s}$, $\vec{t}$, $\vec{s}'$, $\vec{t}'$ $\vec{a}$, $\vec{b}$, and W should not be considered as being tied to a specific embodiment with respect to which they are first introduced in the text. That is, specification of properties of these vectors and matrices in the context of one embodiment does not carry over to another embodiment, unless it is implicit from the text that the properties described are general. In particular, in the context of a first embodiment, a "sinogram $\vec{s}$" and a "tomogram $\vec{t}$" may be introduced, which may then be referred to in the description of the first embodiment as "the sinogram $\vec{s}$" and "the tomogram $\vec{t}$", respectively (or simply "$\vec{s}$" and "$\vec{t}$", respectively). Following which, in the context of a second embodiment, a "sinogram $\vec{s}$" and a "tomogram $\vec{t}$" may again be introduced, and, unless otherwise specified or implied, no properties described in the context of the first embodiment will be assumed as relevant in the context of the second embodiment.

Methods

According to an aspect of some embodiments, there is provided a computer-based method for tomography of specimens (e.g. semiconductor structures) based on scanning electron microscopy. FIG. 1 presents a flowchart of such a method, a method 100, according to some embodiments. Method 100 includes:

An operation 110, wherein a sinogram of a specimen (also referred to as "the tested specimen") is obtained by sequentially projecting e-beams so as to impinge the tested specimen at each of a plurality of projection directions and a plurality of offsets, respectively, and, for each e-beam, measuring a respective intensity of electrons returned from the tested specimen.

An operation 120, wherein a tomogram pertaining to the tested specimen is obtained by determining values indicative of components of a vector $\vec{t}$, which is defined by an equation $W\vec{t} = \vec{s}$. The vector $\vec{s}$ parameterizes the obtained sinogram (i.e. the sinogram of the tested specimen obtained in operation 110). The matrix W accounts for e-beam expansion and attenuation with depth within a nominal specimen, which is of a same, or a similar, design intent as the tested specimen. Each of components $w_{ij}$ of W specifies a contribution of a j-th voxel in a nominal specimen to a value of an i-th element of a nominal sinogram of the nominal specimen, respectively.

As used herein, the term "nominal specimen" is to be understood in an expansive manner as covering a single physical specimen or a modeling of a specimen(s) in the sense of a mathematical description of the specimen(s). In the latter case, the mathematical description may include (i) a specification of parameters (e.g. density, material composition) characterizing a specimen, (ii) a specification of mean parameters characterizing a plurality of specimens of a same or similar design intent, (iii) or design intent specification of parameters of a specimen, or (iv) a specification of parameters derived from (i) and (iii) or (ii) and (iii).

As used herein, the term "projection direction", in reference to an e-beam projected on a sample, is to be understood in a relative sense. In particular, a same projection direction may be achieved by orienting the e-beam or the tested specimen (or both).

According to some embodiments, the tested specimen is or includes a semiconductor structure. According to some such embodiments, the semiconductor structure is a gate all around (GAA) transistor, a fin field-effect transistor (FinFET), or, more generally, any semiconductor structure of a thickness smaller than about 1 μm (micrometer). According to some embodiments, the semiconductor structure is disposed on a bulk (e.g. a silicon bulk). According to some embodiments, the tested specimen is a patterned wafer, e.g. in one of the fabrication stages thereof.

Method 100 may be implemented using a system, such as the system described below in the description of FIG. 9, or a system similar thereto. In particular, according to some embodiments, operation 110 may be implemented using a SEM configured to project e-beams at each of a plurality of non-parallel directions and offsets. According to some such embodiments, and as depicted below in FIGS. 2A-2F, the column of the SEM may be controllably orientable. Additionally, or alternatively, the SEM may include a plurality of columns each configured to project e-beams at or about a respective projection direction.

According to some embodiments, the column of the SEM (or each of the columns of the SEM in embodiments wherein the SEM includes a plurality of columns) may include electron optics configured to allow controllably setting a projection direction of the e-beam. According to some embodiments, operation 110 may be implemented using a plurality of SEMs each configured to project e-beams at a plurality of offsets and at a respective direction, or a respective plurality of directions. Additionally, or alternatively, according to some embodiments, the tested specimen may be mounted on an orientable and rotatable stage, thereby allowing to control the projection direction.

According to some embodiments, in operation 110, the e-beams are offset (e.g. scanned) along at least two non-parallel directions. In particular, when the e-beams (are projected along a plurality of directions and) are offset along two non-parallel directions, the obtained sinogram is three-dimensional. To each triplet specifying the projection direction, the offset along a first direction, and the offset along a second direction corresponds a respective element of the sinogram. According to some embodiments, the e-beam projection directions define a plurality of non-parallel planes. According to some embodiments, the number of projection directions is between about 5 and about 100. According to some embodiments, $\max_{i,j \neq i} \delta_{ij} \leq 120°$, wherein $\delta_{ij}$ denotes the angle between the i-th projection direction and the j-th projection direction (from the plurality of projection directions), and wherein the maximization is carried out over all the projection directions. According to some embodiments, the projection direction is changed at angular increments of between about 0.2° and about 30°. According to some embodiments, adjacent e-beams are offset (i.e. displaced) relative to one another by between about 0.2 nm (nanometer) and about 2 nm. More precisely, according to some embodiments, wherein the e-beam is continuously scanned on a (e.g. top) surface of the tested specimen (so as to be continuously offset), the offsets correspond to distinct intervals, respectively, along the scanning path of the e-beam and the intensity associated with each offset (and the projection direction) in the sinogram is given by the mean intensity over the respective interval. The intervals may measure between about 0.2 nm and about 2 nm.

Figure 2C:
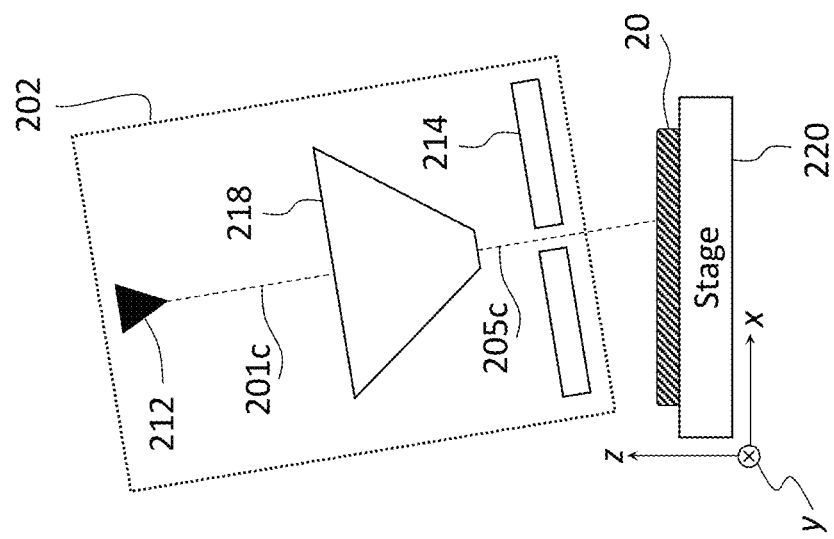
Figure 2B:
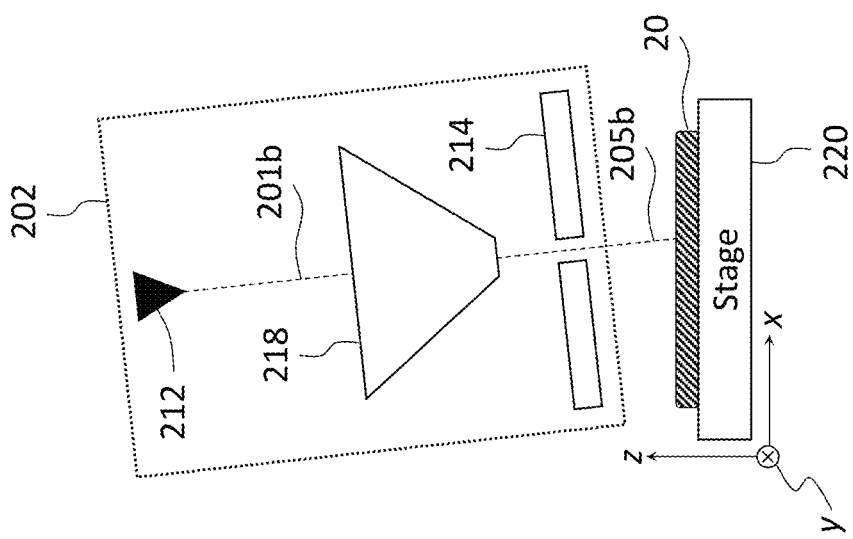
Figure 2A:
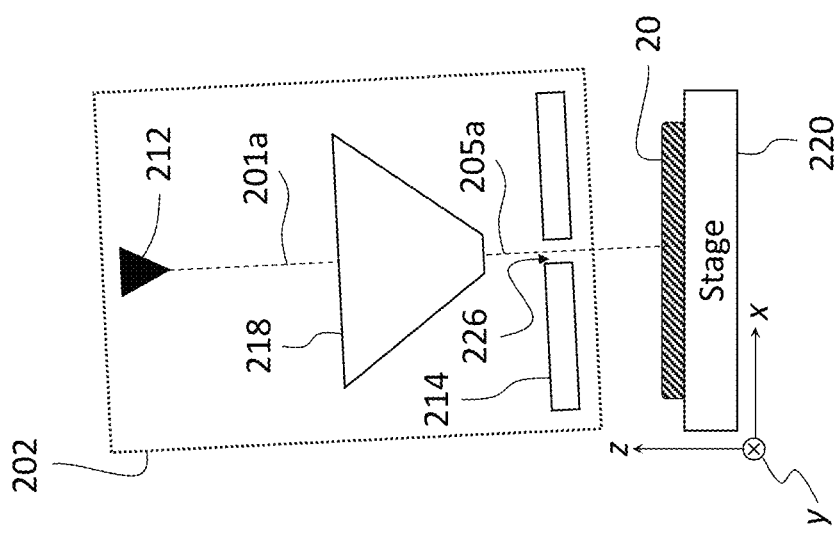

To facilitate the description of operation 110, reference is additionally made to FIGS. 2A-3C. FIGS. 2A-2C schematically depict an implementation of operation 110 of method 100, according to some embodiments thereof. FIG. 2A presents a schematic cross-sectional sideview of a specimen 20 being impinged by an e-beam 205a at an incidence angle $\theta_1$ (determined by the projection direction and the geometry of the top surface of specimen 20, in particular, when the top surface is flat, the incidence angle is determined solely by the projection direction) subtended on the zx-plane, in accordance with measurement operation 110. Further shown are a SEM 202 and a stage 220 on which specimen 20 is placed. SEM 202 is shown delimited by a dotted line to indicate that components included therein may be jointly maneuverable (orientable and/or translatable). According to some embodiments, SEM 202 includes an electron gun 212, an electron sensor 214, a compound lens 218 configured to focus e-beam 205a on specimen 20, a scanner module (not shown) configured to offset e-beam 205a so as to enable scanning over a surface of a specimen, and, optionally, electron optics (not shown), such as magnetic deflectors, configured to controllably set the projection direction of e-beam 205a. According to some embodiments, the scanner module may include additional electron optics—such as some of the electron optics specified below in the description of system 900—configured to this end.

In operation, electron gun 212 produces an e-beam 201a, which is focused by compound lens 218, thereby preparing e-beam 205a. (Compound lens 218 is not rendered as transparent, so that passage therethrough of e-beam 201*a* is not depicted.) According to some embodiments, and as depicted in FIGS. 2A-2F, electron sensor 214 may be annular with a hole 226 for passage therethrough of e-beam 205*a*. Some of the returned electrons (not shown)—i.e. returned electrons scattered towards electron sensor 214, which are sufficiently energetic to reach electron sensor 214—are sensed by electron sensor 214. The above sequence of operations may then be repeated for different projection directions and/or offsets.

FIG. 2B presents a schematic cross-sectional sideview of specimen 20 being impinged at an incidence angle $\theta_2 > \theta_1$ by an e-beam 205*b*. Like $\theta_1$, $\theta_2$ is subtended on the zx-plane. More specifically, FIG. 2B depicts SEM 202 reoriented relative to stage 220, and therefore, specimen 20. E-beam 205*b* is prepared by passing an e-beam 201*b*, produced by electron gun 212, through compound lens 218.

FIG. 2C presents a schematic cross-sectional sideview of specimen 20 being impinged at an incidence angle $\theta_3 > \theta_2$ by an e-beam 205*c*. Like $\theta_2$, $\theta_3$ is subtended on the zx-plane.

More specifically, FIG. 2C depicts SEM 202 reoriented relative to stage 220, and therefore, specimen 20. E-beam 205*c* is prepared by passing an e-beam 201*c*, produced by electron gun 212, through compound lens 218.

Figure 2F:
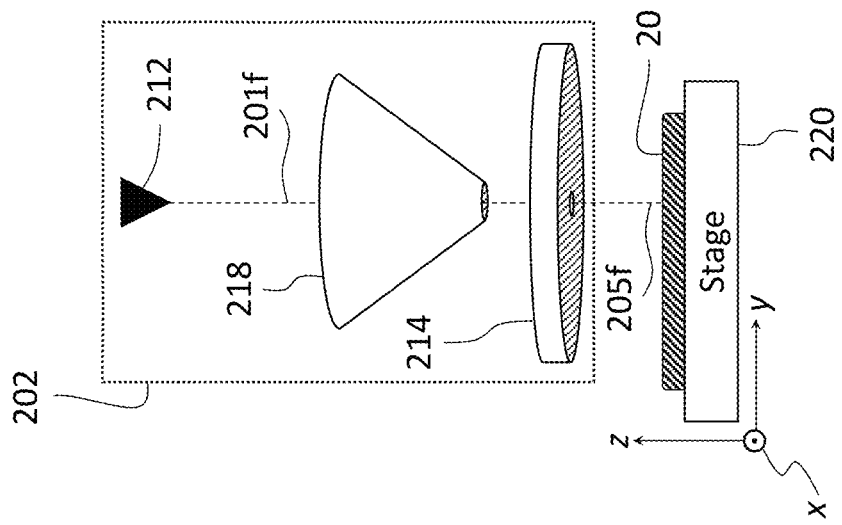
Figure 2E:
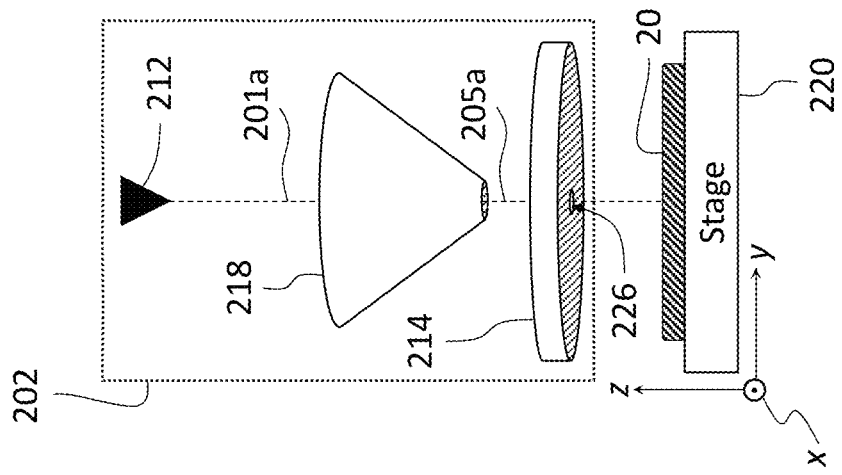
Figure 2D:
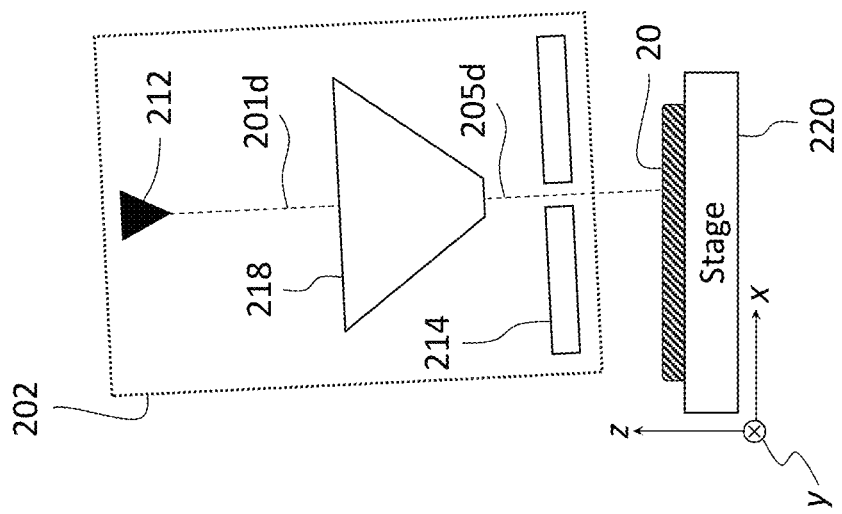

FIG. 2D presents a schematic cross-sectional sideview of specimen 20 being impinged by an e-beam 205*d* at the incidence angle $\theta_1$ but offset along the x-axis relative to e-beam 205*a*. More specifically, FIG. 2D depicts SEM 202 laterally displaced by a distance $\Delta x_1$ along the x-axis relative to stage 220, and therefore, specimen 20. E-beam 205*d* is prepared by passing an e-beam 201*d*, produced by electron gun 212, through compound lens 218.

FIG. 2E presents a schematic perspective sideview of specimen 20 being impinged by e-beam 205*a*. As compared to FIG. 2A, wherein the viewpoint is along the positive y-axis, in FIG. 2E the viewpoint is taken along the negative x-axis.

FIG. 2F presents a schematic perspective sideview of specimen 20 being impinged by an e-beam 205*f* at the incidence angle $\theta_2$ but offset along the (positive) y-axis relative to e-beam 205*a*. More specifically, FIG. 2F depicts SEM 202 laterally displaced by a distance $\Delta y$ relative to stage 220, and therefore specimen 20. E-beam 205*f* is prepared by passing an e-beam 201*f*, produced by electron gun 212, through compound lens 218.

Referring to FIGS. 3A-3C, FIGS. 3A-3C schematically depict an implementation of operation 110 of method 100, according to some embodiments thereof. FIG. 3A presents a schematic cross-sectional sideview of a specimen 30 being impinged by an e-beam 305*a* at an incidence angle $\alpha_1$, subtended on the zx-plane, in accordance with measurement operation 110. Further shown are a SEM 302 and a stage 320 on which specimen 30 is placed. According to some embodiments, SEM 302 includes an electron gun 312, an electron sensor 314, a compound lens 318 configured to focus e-beam 305*a* on specimen 30, and a scanner module (not shown) configured to offset an e-beam so as to enable scanning over a surface of a specimen. According to some embodiments, the scanner module may include electron optics—such as some of the electron optics described below in the description of system 900—configured to this end. Additional electron optics, which may be included in some embodiments, such as magnetic deflectors, are not shown. SEM 302 differs from SEM 202 at least in the positioning and orientation of the electron sensor relative to the specimen, which, according to some embodiments, may render SEM 302 comparatively more suitable to probing at larger e-beam incidence angles.

In operation, electron gun 312 produces an e-beam 301*a*, which is focused by compound lens 318, thereby preparing e-beam 305*a*. (Compound lens 318 is not rendered as transparent, so that passage therethrough of e-beam 301*a* is not depicted.) Some of the returned electrons (not shown)—i.e. returned electrons scattered towards electron sensor 314, which are sufficiently energetic to reach electron sensor 314—are sensed by electron sensor 314. The above sequence of operations may then be repeated for different projection directions and/or offsets.

FIG. 3B presents a schematic cross-sectional sideview of specimen 30 being impinged at an incidence angle $\alpha_2 > \alpha_1$ by an e-beam 305*b*. Like $\alpha_1$, $\alpha_2$ is subtended on the zx-plane. E-beam 305*b* is prepared by focusing by compound lens 318 of an e-beam 301*b* generated by electron gun 312.

FIG. 3C presents a schematic cross-sectional sideview of specimen 30 impinged by an e-beam 305*c* at the incidence angle $\theta_1$. E-beam 305*c* striking location on specimen 30 is offset along the x-axis by relative to the striking location of e-beam 305*b*. E-beam 305*c* is prepared by focusing by compound lens 318 of an e-beam 301*c* generated by electron gun 312.

Referring to operation 120, ideally, that is, if the modeling of the e-beam expansion and attenuation within the nominal specimen were perfectly exact, $w_{ij}$ would be proportional to the mean intensity of the i-th e-beam within the j-th voxel of the nominal specimen. Generally, any variation to a parameter (such as the overall mass density, the relative concentrations of constituents, and so on) of a specimen will manifest not only as a modification to $\vec{t}$ (i.e. the tomogram thereof) but also to W. Nevertheless, if e-beam expansion and attenuation within a nominal specimen are known, a high-accuracy tomogram of a corresponding tested specimen (i.e. a specimen to be tested which has a same design intent as the nominal specimen) may be derived assuming the same behavior of the e-beam within the tested specimen as within the nominal specimen. Accordingly, any modification to the tomogram (relative to that of the nominal specimen) is attributed solely to the corresponding modification to the sinogram. Put slightly differently, given (i) a measured sinogram $\vec{s}$ of a tested specimen, and (ii) a nominal tomogram $\vec{t}'$ of a nominal specimen corresponding to the tested specimen (e.g. of the same design intent), so long as $\vec{t} - \vec{t}'$ is known to be sufficiently small, wherein $\vec{t}$ is the to-be-derived tomogram of the tested specimen, $\vec{t}$ may be computed to a high-accuracy by solving for $\vec{t}$ the equation $W\vec{t} = \vec{s}$, wherein the matrix W is derived based on the nominal tomogram $\vec{t}'$ (and, optionally, the nominal sinogram). The problem of deriving a tomogram of a tested specimen from a sinogram thereof is thus advantageously reduced to solving a set of linear equations.

To facilitate the description of operation 120, reference is additionally made to FIGS. 4A-5C. FIG. 4A presents a schematic cross-sectional view of a specimen 40 with a first e-beam 405 impinging on specimen 40 in accordance with specific embodiments of operation 110. Specimen 40 includes a top layer 42, which may be patterned (e.g. constituting a semiconductor structure of a thickness smaller than about 1 μm) and which is disposed on a (e.g. silicon) bulk 44. Top layer 42 is thin in comparison to bulk 44. As a non-limiting example, wherein specimen 40 is a wafer, top layer 42 may measure about 100 nm in thickness while bulk 44 may measure a few hundred micrometers (e.g. at least 100 µm). Also indicated is a top surface 46 of top layer 42. As a non-limiting example, top layer 42 is shown as including depressions 48 (e.g. trenches).

First e-beam 405a impinges on top surface 46, penetrates into top layer 42, in a non-depressed area thereof, and crosses top layer 42 into bulk 44. First e-beam 405 assumes the shape of an onion within specimen 40. The onion includes a stem 407 (i.e. a stem-shaped portion of first e-beam 405) and a bulb 409 (i.e. a bulb-shaped portion of first e-beam 405). Bulb 409 is fully buried within bulk 44. Substantially all (e.g. at least 80%, at least 90%, or at least 95%) of the backscattered electrons exiting specimen 40 (via top surface 46)—and, in particular, substantially all the backscattered electrons sensed by an electron sensor 414— originate in backscattering events within bulk 44.

First e-beam 405 is shown expanding as the depth increases. Similarly, the intensity of first e-beam 405 is shown decreasing with the depth, as implied by the tone in which first e-beam 405 is rendered becoming lighter with the depth (a grey-level scale is employed with the intensity increasing with darkness). The expansion rate, as well as the attenuation rate, depend on the material properties of the medium, and will typically vary between top layer 42 and bulk 44.

Also illustrated are trajectories 415a, 415b, 415c, 415d, and 415e of returned electrons, which are scattered towards electron sensor 414 and sensed thereby. The trajectories are "zig-zagged" reflecting the random walk nature of electron motion within the specimen.

FIG. 4B presents a schematic cross-sectional view of specimen 40 with a second e-beam 455 impinging on specimen 40 in accordance with specific embodiments of operation 110. More specifically, second e-beam 455 strikes top layer 42 at a depression 48a (from depressions 48), penetrates into top layer 42, and crosses top layer 42 into bulk 44. Second e-beam 455 projection direction is identical to that of first e-beam 405. Also illustrated are trajectories 465a, 465b, and 465c of returned electrons, which are scattered towards electron sensor 414 and sensed thereby.

Second e-beam 455 includes a stem 457 and a bulb 459. Since second e-beam 455 strikes top layer 42 in a depressed region thereof, second e-beam 455 is attenuated to a lesser degree in traversing top layer 42 than first e-beam 405. Accordingly, on transmission into bulk 44 second e-beam 455 has greater power than first e-beam 405 has on transmission into bulk 44. Assuming that bulk 44 is uniform, or at least laterally (i.e. in parallel to the xy-plane) uniform, second e-beam 455 penetrates deeper into bulk 44 than first e-beam 405. Bulb 459 is thus buried deeper within bulk 44 than bulb 409 but is otherwise of same dimensions. Fewer electrons are returned from specimen 40 as a result of the impinging thereof with second e-beam 455 than as a result of the impinging thereof with first e-beam 405.

Generally, all other things being equal, if an incident e-beam strikes a top surface on an area that forms a depression, then fewer electrons will be returned and sensed as compared to if the area were not depressed. Similarly, all other things being equal, if an incident e-beam strikes a top surface on an area that forms a projection (i.e. bulging upwards: e.g. a fin), then more electrons will be returned and sensed as compared to if the area were not projecting. The same applies also with respect to variances in density and material. All other things being equal, if an e-beam strikes a specimen at a first region surrounded by a second region of greater density, then fewer electrons will be returned and sensed as compared to if the first and second regions were of the same density. Similarly, all other things being equal, if an e-beam strikes a specimen at a first region surrounded by a second region of lower density, then more electrons will be returned and sensed as compared to if the first and second regions were of the same density. The present disclosure teaches how measured variations in the numbers of sensed electrons returned from a specimen due to backscattering, can advantageously be utilized to obtain information about the internal geometry, density, and/or composition of the specimen.

FIG. 5A presents a schematic cross-sectional view of a nominal specimen 50' with an e-beam 505 impinging on a top layer 52' of nominal specimen 50' in accordance with specific embodiments of operation 110. Top layer 52' may be patterned (e.g. constituting a semiconductor structure of a thickness smaller than about 1 µm). Only a top portion of a stem 507 of e-beam 505 is shown in FIG. 5A. Top layer 52' is disposed on a bulk 54' (e.g. a silicon bulk: only a top portion of bulk 54' is shown in FIG. 5A) of nominal specimen 50'. As a non-limiting example, top layer 52' is shown as including alternately disposed first sublayers 52a' of a first material (e.g. SiGe or Au) and second sublayers 52b' of a second material (e.g. SiN or $SiO_2$).

E-beam 505 is generated by an electron gun 512 (such as, for example, electron gun 212). Also indicated is a p-th incidence angle $\theta_p$ (corresponding to the p-th projection direction) at which e-beam 505 impinges on top layer 52', and an l-th offset $\vec{u}_l$ of e-beam 505, which specifies the distance and direction by which electron gun 512 and nominal specimen 50' are offset relative to one another (as measured with respect to a vertical axis O). A striking location L of e-beam 505 on top layer 52' (and, therefore, the entry point of e-beam 505 into nominal specimen 50') is determined by $\theta_p$ (or, more precisely, a unit vector specifying the relative incidence direction) and $\vec{u}_l$. Also indicated by a dotted curve are regions 56a' and 56b' of nominal specimen 50'.

E-beam 505 assumes the shape of an onion including a stem (i.e. stem 507, partially shown) and a bulb (not shown) within nominal specimen 50'. E-beam 505 is shown expanding in nominal specimen 50' as the depth (measured from the striking location L) increases. Thus, for example, at a depth $D_1$ e-beam 505 has a width $c_1 > c_0$, wherein $c_0$ is the width on entry into nominal specimen 50', at a depth $D_2$ e-beam 505 has a width $c_2 > c_1$, and at a depth $D_3$ e-beam 505 has a width $c_3 > c_2$. Similarly, the intensity of e-beam 505 is shown decreasing with the depth, as implied by the tone in which e-beam 505 is rendered becoming lighter with the depth (a grey-level scale is employed with the intensity increasing with darkness).

Also illustrated in FIG. 5A is an e-beam axis A (i.e. a longitudinal axis centrally extending along e-beam 505). In the standard approach, employed in TEM tomography, there is no accounting for the expansion and attenuation of e-beam 505 within nominal specimen 50'. In particular, as described above before the Systems subsection, in the standard approach, employed in TEM tomography, the values of the components of W corresponding to a given incidence angle (e.g. $\theta_p$) of e-beam 505 and a given offset (e.g. $\vec{u}_l$) of e-beam 505 are determined by the intersection length of the e-beam axis A with each of the voxels crossed thereby. In contrast, the present disclosure accounts for the e-beam expansion and attenuation within a tested specimen (or, more precisely, within a top layer thereof), as described next.

Referring to FIG. 5B, FIG. 5B schematically depicts (an image of) nominal specimen 50', according to some embodiments. A three-dimensional grid G' (the extension thereof along the y-axis is not visible in FIG. 5B), which is shown superimposed on nominal specimen 50', partitions nominal specimen 50' into voxels 58'. A voxelated e-beam 55 corresponds to a "voxelization" of e-beam 505. More precisely, and as detailed below, voxelated e-beam 55 is obtained by voxelization of a simulated e-beam, which simulates the expansion and attenuation of e-beam 505 within nominal specimen 50'. To facilitate the description, it is assumed that the fidelity of the simulation is perfect, so that no distinction is made between e-beam 505 and the simulated e-beam corresponding thereto. Details specifying how to simulate the expansion and attenuation of an e-beam within a specimen, according to some embodiments, are provided below.

Voxels 58e' indicate voxels (from voxels 58') fully or partially included in the volume defined by e-beam 505. Each of voxels 58e' is colored according to the power of e-beam 505 in the voxel. More precisely, each of the voxels in the first group is colored proportionally to the power of e-beam 505 within the voxel (i.e. the power of the portion of e-beam 505 passing through the voxel).

As a non-limiting example, assuming that nominal specimen 50' is shaped as a rectangular box, a natural choice for labeling the voxels in nominal specimen 50' is provided by i=KL·(m−1)+K·(l−1)+k, wherein 1≤k≤K, 1≤l≤L, and 1≤m≤M. K, L, and M are the number of voxels in each line of voxels extending in parallel to the x-axis, the y-axis, and the z-axis, respectively. Similarly, according to some embodiments, wherein the e-beams are offset in operation 110 along two non-parallel directions, a natural choice for labeling the elements making up the measured sinogram (i.e. the sinogram obtained in operation 110)—or, equivalently, the order by which the e-beams are labelled—is provided by j=RQ·(p−1)+R·(q−1)+r, wherein 1≤p≤P, 1≤q≤Q, and 1≤r≤R. P is the number of projection directions at which the e-beams are impinged. Q and R are the numbers of offsets along a first direction and a second direction, respectively.

The values of the $w_{ij}$ may be determined from the modeling of the penetration of a plurality of e-beams (such as e-beam 505) into nominal specimen 50'. More specifically, the $w_{ij}$ may be determined based at least on the simulated expansion and attenuation of the e-beams within nominal specimen 50'.

Referring to FIG. 5C, FIG. 5C depicts (an image of) a tested specimen 50, which is of a same intended design as nominal specimen 50', according to some embodiments. Tested specimen 50 includes a top layer 52 disposed on a bulk (not shown). Top layer 52 includes first sublayers 52a' and second sublayers 52b', which are alternately disposed. A three-dimensional grid G (the extension thereof along the y-axis is not visible in FIG. 5C), which is shown superimposed on tested specimen 50, partitions tested specimen 50 into voxels 58. Also indicated are regions 56a and 56b, which occupy the same volumes within tested specimen 50 as regions 56a' and 56b', respectively, within nominal specimen 50'. Due to manufacturing imperfections, the overall concentration of matter within regions 56a and 56b differs from the overall concentration of matter within regions 56a' and 56b', respectively. (To facilitate the description, outside of regions 56a and 56b tested specimen 50 is assumed not to differ from nominal specimen 50'.)

Voxelated e-beam 55 is shown superimposed over tested specimen 50 emphasizing that—in accordance with method 100—in order to derive the tomogram of a tested specimen, the expansion and attenuation of e-beams within the tested specimen may be taken into account based on simulation of expansion and attenuation of e-beams within a nominal specimen of a same intended design as the tested specimen. More specifically, as mentioned above prior to the description of method 100, given a sinogram $\vec{s}$ (obtained in operation 110) of tested specimen 50, the corresponding tomogram may be obtained by solving for $\vec{t}$ the equation W $\vec{t} = \vec{s}$, wherein W accounts for the expansion and attenuation of e-beams within nominal specimen 50'. According to some embodiments, the equation may be iteratively solved using an ART algorithm, such as a standard ART algorithm, a simultaneous iterative reconstructive technique (SIRT) algorithm, a simultaneous algebraic reconstruction technique (SART) algorithm, or a discrete algebraic reconstruction technique (DART) algorithm. In embodiments wherein $\vec{t}$ has more components than $\vec{s}$ (so that the matrix equation is underdetermined), regularization techniques, such as "total variation" may be employed to reduce noise or other reconstruction artefacts.

The matrix W (i.e. the values of the $w_{ij}$) may be derived by modeling the expansion and attenuation of e-beams within nominal specimen 50' taking into account ground truth data thereof (i.e. the nominal tomogram, which according to some embodiments is obtained by subjecting nominal specimen 50' to destructive measurements). The modeling of the expansion and attenuation of the e-beams may take into account known design data of nominal specimen 50' specifying the material composition thereof (including the density distribution of each material), and the cross-sections for elastic electron scattering, and, optionally, inelastic electron scattering, within each of the materials included in nominal specimen 50'. These scattering cross-sections may be known in the art, or, otherwise, experimentally estimated. According to some embodiments, the matrix W may be derived additionally taking into account a nominal sinogram of nominal specimen 50'. In such embodiments, prior to subjecting nominal specimen 50' to destructive measurements, a sinogram (i.e. the nominal sinogram) thereof is obtained. According to some embodiments, method 100 may include an initial operation of deriving the matrix W.

According to some embodiments, the modeling of the expansion and attenuation of e-beams within a nominal specimen includes deriving a set of kernels $\{\kappa_{\theta,\vec{f},d}\}_{\theta,\vec{f},d}$ and attenuation factors $\{\eta_{\theta,\vec{f},d}\}_{\theta,\vec{f},d}$, wherein the index θ labels the projection direction, the index $\vec{f}$ labels the lateral offset of the e-beam, and the index d labels the distance (computed relative to the nominal specimen) from the entry point of the e-beam to a center of a voxel. Here θ, $\vec{f}$, and d should be understood as running indices, as implied by indexing of the curly brackets.

While tested specimen 50 is depicted as having a flat top surface, generally, the top surface (i.e. the surface through which the projected e-beams enter the tested specimen) of a tested specimen need not be flat and information regarding the topography of the top surface may be extracted from the obtained sinogram. The skilled person will appreciate that method 100 may be applied both in the case wherein top surface is nominally flat (i.e. the top surface of the nominal specimen is flat) but in actuality the top surface (of the tested specimen) is not flat, and the case wherein by design intent the top surface is not flat (e.g. including areas of different elevation).

Referring to FIG. 6A, an n-th e-beam 605 is shown projected on a specimen 60, according to some embodiments. To simplify matters, the discussion is restricted to two dimensions (i.e. the y coordinate is dropped). Indicated are the intersection lengths $l_{m-1}$, $l_m$, and $l_{m+1}$ of e-beam 605 with adjacent voxels $v_{m-1}$, $v_m$, and $v_{m+1}$, respectively. Voxels $v_{m-1}$, $v_m$, and $v_{m+1}$ are located at a depth D (alternatively, intersection volumes may be used instead of intersection lengths). The intersection lengths of e-beam 605 with the rest of the voxels along the line (i.e. the line including voxels $v_{m-1}$, $v_m$, and $v_{m+1}$) are zero.

Referring to FIG. 6B, the values of intersection lengths (including the intersections lengths $l_{m-1}$, $l_m$, and $l_{m+1}$) are plotted (black dots). Center points of voxels $v_{m-3}$ to $v_{m+3}$ are marked on the horizontal axis. The grey curve is obtained by applying the kernel $\kappa_{\theta, \vec{f}, d}$ (e.g. a low-pass filter) to the set of intersections lengths. The white dots are distributed along the grey curve and indicate the values (up to multiplication by an attenuation factor) to be assigned to the W components pertaining to the n-th e-beam and each of the m-th voxel (i.e. $w_{m,n}$) and voxels laterally close to the m-th voxel (e.g. $w_{m-3,n}$ to $w_{m-1,n}$ and $w_{m+1,n}$ to $w_{m+3,n}$).

According to some embodiments, in order to facilitate, or at least expedite, solving the equation $W\vec{t}=\vec{s}$, (prior to the solving of the equation and following the derivation steps described above) components of W smaller than a threshold value are set equal to zero (thereby making W more sparse).

According to some embodiments, wherein the required accuracy of the tomogram of the tested specimen is sufficiently low, the equation $W\vec{t}=\vec{s}$ may be solved taking into account only the attenuation of e-beams within the nominal specimen and discounting the expansion thereof (thereby making W more sparse as compared to when the expansion is not discounted). Still, according to some embodiments, wherein the required accuracy of the tested specimen is sufficiently low, and the projected e-beams are highly energetic, the equation $W\vec{t}=\vec{s}$ may be solved discounting both the expansion and the attenuation of e-beams within the nominal specimen (thereby making W even more sparse as compared to when the attenuation is not discounted).

FIG. 7 presents a flowchart of a method 700, which corresponds to specific embodiments of method 100. Method 700 includes:

An operation 710, wherein a sinogram of a specimen (also referred to as "the tested specimen") is obtained by sequentially projecting e-beams so as to impinge the tested specimen at each of a plurality of projection directions and a plurality of offsets, respectively, and, for each of the e-beams, measuring a respective intensity of electrons returned from the tested specimen.

An operation 715, wherein a difference sinogram is obtained by subtracting a nominal sinogram $\vec{s}'$ from the obtained sinogram. The nominal sinogram pertains to a nominal specimen, which is of a same, or a similar, design intent as the tested specimen.

An operation 720, wherein a difference tomogram, parameterized by a vector $\vec{b}=\vec{t}-\vec{t}'$, and pertaining to the tested specimen, is obtained by solving for $\vec{b}$ an equation $W\vec{b}=\vec{a}$. $\vec{t}$ parameterizes a tomogram pertaining to the tested specimen. $\vec{t}'$ parameterizes a (nominal) tomogram pertaining to the nominal specimen. $\vec{a}=\vec{s}-\vec{s}'$, wherein $\vec{s}$ parameterizes the obtained sinogram (i.e. obtained in operation 710). The matrix W accounts for e-beam expansion and attenuation with depth within the nominal specimen. Each of components $w_{ij}$ of W specifies a contribution of a j-th voxel in the nominal specimen to a value of an i-th element of the nominal sinogram, respectively.

Method 700 may be implemented using a system, such as the system described below in the description of FIG. 9, or a system similar thereto. According to some embodiments, operation 710 may be implemented as described above with respect to operation 110.

According to some embodiments, operation 710 may be implemented using a SEM, such as SEM 202. Similarly, according to some embodiments, operation 720 may be implemented as described above with respect to operation 120 substituting $\vec{a}$ and $\vec{b}$ for $\vec{s}$ and $\vec{t}$, respectively. The matrix W is the same as utilized in method 100. In particular, the values of the $w_{ij}$ (i.e. components of the matrix W) may be obtained as described above in the description of FIGS. 5A-6B.

According to some embodiments, operation 715 may further include, prior to the subtraction of $\vec{s}'$, registering $\vec{s}$ relative to $\vec{s}$. According to some such embodiments, the registration may be with respect to translation offsets and/or signal level offsets. Registration with respect to translation offsets may be required to ensure that images pertaining to two different specimens (e.g. sinograms pertaining to the nominal specimen and the tested specimen) are aligned before the subtraction. Registration with respect to signal level offsets may be required to account for variances in brightness between images pertaining to different specimens due to instabilities of the measurement system over time (e.g. changes in the sensitivity of the electron sensor).

In some embodiments, working with a difference sinogram pertaining to a tested specimen, rather than the solely with the sinogram thereof (i.e. working with $\vec{a}$ instead of solely with $\vec{s}$), may potentially render the extraction of $\vec{t}$ computationally less cumbersome and/or increase the reliability of the extraction. This may intuitively be understood from the fact that as compared to the nominal tomogram $\vec{t}'$ (as well as $\vec{t}$) the difference tomogram $\vec{b}$ describes a less dense structure, since components of $\vec{b}$ will typically be smaller than components of $\vec{t}'$. Moreover, the structure described by the difference tomogram $\vec{b}$ may be smaller than the tested specimen when the variations between the tested specimen and nominal specimen are localized. On a purely mathematical level, since components of $\vec{b}$ will typically be smaller than components of $\vec{t}$, the fidelity of the linear approximation—whereby the matrix W is derived based on the nominal tomogram $\vec{t}'$ (rather than on the tested tomogram $\vec{t}$)—is greater when employed to solve $W\vec{b}=\vec{a}$ for $\vec{b}$ than when employed to solve $W\vec{t}=\vec{s}$ for $\vec{t}$. Accordingly, limitations of, and/or imprecisions in, the modeling of W may potentially impact less the determination of $\vec{b}$ (i.e. through the solving of $W\vec{b}=\vec{a}$) than direct determination of $\vec{t}$ (i.e. through the solving of $W\vec{t}=\vec{s}$). This in turn implies that for a given required precision, according to some embodiments, certain relaxations may be applied (e.g. by making W more sparse) to expedite the computation of $\vec{b}$, which could not be "tolerated" if directly solving for $\vec{t}$.

To facilitate the description of method 700, reference is additionally made to FIGS. 8A-8F. FIG. 8A provides a schematic cross-sectional view of a trapeze-shaped nominal specimen 80'. Nominal specimen 80' is assumed to be uniform and made of silicon.

FIG. 8B provides a schematic cross-sectional of a trapeze-shaped tested specimen 80. Tested specimen 80 differs from nominal specimen 80' in including a gold line 82, which extends along the y-axis (i.e. pointing into the page).

FIG. 8C is a (two-dimensional) nominal sinogram, which corresponds to the cross-section of nominal specimen 80' depicted in FIG. 8A. The nominal sinogram was obtained through computer simulation. More specifically, the computer simulation modeled sequential projection of e-beams on nominal specimen 80' at each of a plurality of projection directions and a plurality of offsets, respectively, and, for each e-beam, measurement of a respective intensity of electrons returned from nominal specimen 80', in accordance with operation 710.

FIG. 8D is a (two-dimensional) sinogram, which corresponds to the cross-section of tested specimen 80 depicted in FIG. 8B. The sinogram was obtained through computer simulation of operation 710.

FIG. 8E is a (two-dimensional) difference sinogram obtained through application of operation 715, that is, by subtracting the nominal sinogram of FIG. 8C from the sinogram of FIG. 8D.

In each of FIGS. 8C-8E a dark blue to yellow scale is employed with dark blue denoting minimum intensity. Since gold is much denser than silicon, the inclusion of gold line 82 is manifested as a bright (yellow) streak in the sinogram of FIG. 8D, due to an increase in the number of backscattered electrons sensed (i.e. more electrons are backscattered as a result of the presence of gold line 82).

FIG. 8F presents a (two-dimensional) difference tomogram 80" obtained through application of operation 720, that is, by subtracting the nominal sinogram of FIG. 8C from the sinogram of FIG. 8D. A grey-level scale is employed with the density increasing with darkness and white corresponding to zero density. Indicated is a region 82" of the difference tomogram 80" whereat the density markedly differs from zero, which signals the presence of gold line 82 in tested specimen 80.

Systems

According to an aspect of some embodiments, there is provided a computerized system for scanning electron microscopy-based tomography of specimens (e.g. patterned wafers and/or semiconductor structures therein or thereon). FIG. 9 schematically depicts such a system, a computerized system 900, according to some embodiments. As will be apparent from the description thereof, system 900 may be used to implement each of methods 100 and 700.

System 900 includes e-beam generation equipment 902 (one or more electron guns: not shown), electron sensing equipment 904 (one or more electron sensors and a scanner module: not shown), computer hardware 906, and a controller 908. According to some embodiments, system 900 may further include electron optics 912 configured to direct and/or focus an e-beam generated by e-beam generation equipment 902, and/or direct electrons (e.g. onto electron sensing equipment 904) scattered from a specimen due to the irradiation thereof with the e-beam. According to some embodiments, and as depicted in FIG. 9, e-beam generation equipment 902, electron sensing equipment 904, electron optics 912, and controller 908 may constitute components of a SEM 920. Alternatively, according to some embodiments, controller 908 may be included in computer hardware 906.

According to some embodiments, system 900 may further include a stage 924 configured to accommodate a (tested) specimen 90. According to some embodiments, specimen 90 is or includes a semiconductor structure. According to some such embodiments, the semiconductor structure is a GAA transistor, a FinFET, or any semiconductor structure of a thickness smaller than about 1 μm. According to some embodiments, the semiconductor is disposed on a bulk (e.g. a silicon bulk). According to some embodiments, specimen 90 is a patterned wafer. It is noted that specimen 90 does not form part of system 900.

Dotted lines between elements indicate functional or communicational association between the elements.

An incident e-beam 905, generated by e-beam generation equipment 902, is shown impinging on a top surface 94 specimen 90. As a result of the impinging of incident e-beam 905 on specimen 90, and the penetration of incident e-beam 905 into specimen 90, backscattered electrons are returned from specimen 90. Arrows 915 indicate trajectories of backscattered electrons, which are scattered from specimen 90 in the direction of electron sensing equipment 904.

According to some embodiments, e-beam generation equipment 902 may be configured to allow controllably setting an orientation and/or an offset of an e-beam projected thereby, and scan the e-beam on a tested specimen (e.g. specimen 90). According to some such embodiments, an electron gun (not shown)—such as, for example, electron gun 212 or electron gun 312—of e-beam generation equipment 902 may be orientable and/or translatable. According to some embodiments, e-beam generation equipment 902 may include a plurality of electron guns (not shown), each configured to project an e-beam at a respective orientation (or range of orientations) and/or offset. According to some embodiments, each of the electron guns may be mechanically orientable and/or translatable. Additionally, or alternatively, according to some embodiments, stage 924 may be (i) translatable, so as to allow controllably setting an offset of an e-beam impinging thereon, and/or (ii) orientable and rotatable, so as to allow controllably setting a projection direction of the impinging e-beam relative to the specimen.

According to some embodiments, electron optics 912 may include an electrostatic lens(es) and a magnetic deflector(s), which may be used to guide and manipulate an e-beam generated by e-beam generation equipment 902, and thereby controllably set a projection direction and/or an offset of the generated e-beam.

Electron sensing equipment 904 may include one or more electron sensors (e.g. BSE detectors), which are configured to sense electrons returned from specimen 90 (e.g. backscattered electrons). Electron sensing equipment 904 is configured to relay (optionally, via controller 908) the data collected thereby (e.g. the measured intensities of e-beams incident on each of the electron sensors) to computer hardware 906.

According to some embodiments, electron optics 912 may include an electrostatic lens(es) and a magnetic deflector(s), which may be used to guide onto electron sensing equipment 904 at least backscattered electrons generated due to the penetration of an e-beam into specimen 90.

According to some embodiments, electron sensing equipment 904 may include a large-area BSE detector (not shown) including a plurality of independently and individually actuatable (i.e. on/off switchable) segments. Each of the segments may be positioned so as to sense backscattered electrons returned at a respective return angle, thereby allowing to selectively sense backscattered electrons returned from specimen 90 at any one of a plurality of return angles. Additionally, or alternatively, according to some embodiments, electron sensing equipment 904 (or one or more components thereof) may be laterally and/or vertically translatable, thereby allowing to control the collection angle (i.e. sense backscattered electrons returned from specimen 90 at a desired return angle).

According to some embodiments, SEM 920 and stage 924 may be housed within a vacuum chamber 930.

Controller 908 may be functionally associated with e-beam generation equipment 902 and, optionally, stage 924. More specifically, controller 908 is configured to control and synchronize operations and functions of the above-listed equipment, tools, and components during profiling of a tested specimen. In particular, controller 908 may be configured to instruct e-beam generation equipment 902 and/or stage 924 to change the projection direction of incident e-beam 905 and/or change the striking location of incident e-beam 905 on top surface 94 (or, what is the same thing, the offset of incident e-beam 905) or shift a line along which e-beam 905 is scanned. According to some embodiments, controller 908 may be configured to instruct e-beam generation equipment 902 and/or stage 924 to offset incident e-beam 905 along two non-parallel directions, so that the obtained sinogram is three-dimensional. According to some embodiments, controller 908 may be configured to instruct e-beam generation equipment 902 and/or stage 924 to change the projection direction of incident e-beam 905 so that the totality of projection directions defines a plurality of non-parallel planes. According to some embodiments, the number of projection directions is between about 5 and about 100. According to some embodiments, $\max_{i,j \neq i} \delta_{ij} \leq 120°$, wherein $\iota_{ij}$ denotes the angle between the i-th projection direction and the j-th projection direction, and wherein the maximization is carried out over all the projection directions. According to some embodiments, controller 908 is configured to instruct e-beam generation equipment 902 and/or stage 924 to vary the projection direction of incident e-beam 905 at angular increments of between about 0.2° and about 30°.

Computer hardware 906 includes one or more processors (i.e. processor(s) 940), and, optionally, RAM and/or non-volatile memory components: not shown). The one or more processors are configured to execute software instructions stored in the non-volatile memory components. Through the execution of the software instructions, a sinogram (e.g. obtained by electron sensing equipment 904) of a tested specimen (e.g. specimen 90) is processed to obtain a tomographic map pertaining to the tested specimen, essentially as described above in the description of FIGS. 1-6B or in the description of FIG. 7. In particular, given a sinogram $\vec{s}$ of a tested specimen, the one or more processors are configured to solve for $\vec{t}$ the equation $W\vec{t}=\vec{s}$, wherein W accounts for e-beam expansion and attenuation within a nominal specimen, which is of a same, or a similar, design intent as the tested specimen. To this end, according to some embodiments, computer hardware 906 may be configured to apply an ART algorithm (e.g. a standard ART algorithm, a SIRT algorithm, a SART algorithm, or a DART algorithm), optionally, employing regularization, as described above in the description of method 100.

According to some embodiments, the tomographic map may be constituted by, or obtained from a difference tomogram. The difference tomogram may be obtained from a corresponding difference sinogram as described above in the description of method 700. In particular, according to some embodiments, given a sinogram $\vec{s}$ of a tested specimen (and a nominal tomogram $\vec{t}'$ and a nominal sinogram $\vec{s}'$), the one or more processors may be configured to solve for $\vec{b}$ the equation $W\vec{b}=\vec{a}$ (wherein $\vec{b}=\vec{t}-\vec{t}'$ and $\vec{a}=\vec{s}-\vec{s}'$). According to some such embodiments, computer hardware 906 may be configured to, as part of obtaining the difference sinogram, prior to the subtraction of the nominal sinogram, register the obtained sinogram relative to the nominal sinogram. To this end, according to some embodiments, computer hardware 906 may include a graphics processing unit (GPU). According to some embodiments, the registration may be with respect to translation offsets and/or signal level offsets, as described above in the description of method 700.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

According to some embodiments, an estimated quantity or estimated parameter may be said to be "about optimized" or "about optimal" when falling within 5%, 10% or even 20% of the optimal value thereof. Each possibility corresponds to separate embodiments. In particular, the expressions "about optimized" and "about optimal" also cover the case wherein the estimated quantity or estimated parameter is equal to the optimal value of the quantity or the parameter. The optimal value may in principle be obtainable using mathematical optimization software. Thus, for example, an estimated (e.g. an estimated residual) may be said to be "about minimized" or "about minimal/minimum", when the value thereof is no greater than 101%, 105%, 110%, or 120% (or some other pre-defined threshold percentage) of the optimal value of the quantity. Each possibility corresponds to separate embodiments.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

Referring to the figures, in block diagrams and flowcharts, optional elements and operations, respectively, may appear within boxes delineated by a dashed line. Further, in block diagrams, dotted lines connecting elements may be used to represent functional association or at least one-way or two-way communicational association between the connected elements.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations of methods, according to some embodiments, may be described in a specific sequence, the methods of the disclosure may include some or all of the described operations carried out in a different order. In particular, it is to be understood that the order of operations and suboperations of any of the described methods may be reordered unless the context clearly dictates otherwise, for example, when a latter operation requires as input the output of earlier operation or when a latter operation requires the product of an earlier operation. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purposes and should not be regarded as limiting. Citation or identification of any reference in this application shall not be construed as an admission that such reference is available as prior art to the disclosure. Section headings are used herein to case understanding of the specification and should not be construed as necessarily limiting.

What is claimed is:

1. A system for non-destructive tomography of specimens, the system comprising:
   a scanning electron microscope (SEM) configured to obtain a sinogram of a tested specimen, parameterized by a vector $\vec{s}$, by sequentially projecting e-beams on the tested specimen at each of a plurality of projection directions and a plurality of offsets, respectively, and, for each e-beam, measuring a respective intensity of electrons returned from the tested specimen; and
   one or more processors configured to obtain a tomographic map, pertaining to the tested specimen, by determining values indicative of components of a vector $\vec{t}$ defined by an equation $W\vec{t}=\vec{s}$, wherein W is a matrix with components $w_{ij}$ specifying a contribution of a j-th voxel in a nominal specimen to a value of an i-th element of a nominal sinogram of the nominal specimen, respectively;
   wherein the tested specimen is of a same, or a similar, design intent as the nominal specimen; and
   wherein the matrix W accounts for e-beam expansion and attenuation with depth within the nominal specimen.

2. The system of claim 1, wherein the SEM comprises an electron gun, one or more electron sensors, a compound lens configured to focus on the specimen an e-beam generated by the electron gun, electron optics configured to orient the e-beam, and a scanner module configured to offset the e-beam.

3. The system of claim 1, wherein the tomographic map is constituted by a difference tomogram parameterized by a vector $\vec{b}=\vec{t}-\vec{t}'$, wherein $\vec{t}'$ is a vector specifying a tomogram of the nominal specimen; and
   wherein, as part of obtaining the tomographic map, the one or more processors are configured to (i) obtain a difference sinogram by subtracting the nominal sinogram from the sinogram, obtained in the operation of using the SEM, and (ii) solve for $\vec{b}$ an equation $W\vec{b}=\vec{a}$, wherein $\vec{a}=\vec{s}-\vec{s}'$ with $\vec{s}'$ being a vector parameterizing the nominal sinogram of the nominal specimen.

4. The system of claim 1, wherein the offsets are along at least two non-parallel directions and/or the e-beam projection directions define a plurality of non-parallel planes, and wherein the obtained tomographic map is three-dimensional.

5. The system of claim 1, wherein each non-vanishing component of W is greater than a preselected threshold value, thereby expediting the solving of $W\vec{t}=\vec{s}$.

6. The system of claim 3, wherein, as part of the obtaining of the difference sinogram, prior to the subtraction of the nominal sinogram, the one or more processors are further configured to register the obtained sinogram relative to the nominal sinogram.

7. The system of claim 1, wherein a number of the projection directions is between about 5 and about 100 and the projection directions are changed at angular increments of between about 0.2° and about 30°.

8. The system of claim 1, wherein adjacent e-beams are offset relative to one another by between about 0.2 nm and about 2 nm.

9. The system of claim 1, wherein the one or more processors are configured to iteratively solve for $\vec{t}$ the equation $W\vec{t}=\vec{s}$.

10. The system of claim 9, wherein the one or more processors are configured to execute an algebraic reconstruction technique (ART) algorithm to solve the equation.

11. The system of claim 1, wherein the tested specimen is or comprises a semiconductor structure, which is disposed on a silicon bulk.

12. The system of claim 11, wherein the semiconductor structure is a gate all around (GAA) transistor or a fin field effect transistor (FinFET).

13. A computer-based method for non-destructive scanning electron microscopy-based tomography of specimens, the method comprising operations of:
   sequentially projecting e-beams so as to impinge a tested specimen at each of a plurality of projection directions and a plurality of offsets, respectively, and, for each e-beam, measuring a respective intensity of electrons returned from the tested specimen, thereby obtaining a sinogram parameterized by a vector $\vec{s}$; and
   obtaining a tomographic map pertaining to the tested specimen by determining values indicative of components of a vector $\vec{t}$, which is defined by an equation $W\vec{t}=\vec{s}$, wherein W is a matrix with components $w_{ij}$ specifying a contribution of a j-th voxel in a nominal specimen to a value of an i-th element of a nominal sinogram of the nominal specimen, respectively;

wherein the tested specimen is of a same, or a similar, design intent as the nominal specimen; and wherein the matrix W accounts for e-beam expansion and attenuation with depth within the nominal specimen.

14. The method of claim 13, further comprising an intermediate operation, wherein a difference sinogram is obtained by subtracting the nominal sinogram from the sinogram obtained in the operation of using the SEM;

wherein the tomographic map is constituted by a difference tomogram parameterized by a vector $\vec{b} = \vec{t} - \vec{t}'$, wherein $\vec{t}'$ is a vector specifying a tomogram of the nominal specimen; and wherein the operation of obtaining the tomographic map comprises solving for $\vec{b}$ an equation $W\vec{b} = \vec{a}$, wherein $\vec{a} = \vec{s} - \vec{s}'$ with $\vec{s}'$ being a vector specifying a nominal sinogram of the nominal specimen.

15. The method of claim 13, wherein the offsets are along at least two non-parallel directions and/or the e-beam projection directions define a plurality of non-parallel planes, and wherein the obtained tomographic map is three-dimensional.

16. The method of claim 13, wherein each non-vanishing component of W is greater than a preselected threshold value, thereby expediting the solving of $W\vec{t} = \vec{s}$.

17. The method of claim 13, further comprising an initial operation of obtaining a nominal tomogram pertaining to the nominal specimen, and, based at least thereon and e-beam data specifying the expansion and attenuation of e-beams within the nominal specimen, deriving the matrix W.

18. The method of claim 17, wherein the e-beam data is generated using a computer simulation modeling the expansion and attenuation of e-beams in the nominal specimen.

19. The method of claim 13, wherein $W\vec{t} = \vec{s}$ is iteratively solved for $\vec{t}$ using an algebraic reconstruction technique (ART) algorithm.

20. The method of claim 13, wherein the tested specimen is or comprises a semiconductor structure, which is of a thickness smaller than 1 μm, and which is disposed on a silicon bulk.

* * * * *